(12) United States Patent
Destro et al.

(10) Patent No.: US 8,262,945 B2
(45) Date of Patent: Sep. 11, 2012

(54) STABILIZATION OF PHOTOCHROMIC SYSTEMS

(75) Inventors: Mara Destro, Bologna (IT); Dario Lazzari, Bologna (IT); Dirk Simon, Lörrach-Brombach (DE); Manuele Vitali, Bologna (IT)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 12/508,641

(22) Filed: Jul. 24, 2009

(65) Prior Publication Data

US 2009/0289236 A1 Nov. 26, 2009

Related U.S. Application Data

(63) Continuation of application No. 10/572,154, filed as application No. PCT/EP2004/052238 on Sep. 20, 2004, now abandoned.

(30) Foreign Application Priority Data

Sep. 29, 2003 (EP) .................................... 03103587

(51) Int. Cl.
*G02B 5/23* (2006.01)
*G02C 5/08* (2006.01)
*C07D 251/00* (2006.01)

(52) U.S. Cl. ......... 252/586; 8/115.59; 252/589; 351/63; 524/91; 524/95; 524/100; 524/120; 544/113; 544/194; 544/207; 544/216; 544/231; 544/357; 544/360; 546/188; 546/189; 546/225

(58) Field of Classification Search .................. 351/63; 524/91, 95, 100, 120; 544/113, 216, 194, 544/207, 231, 357, 360; 252/582, 586, 589; 8/115.59; 546/188, 189, 225

See application file for complete search history.

(56) References Cited

U.S. PATENT DOCUMENTS

| | | | | |
|---|---|---|---|---|
| 3,488,290 | A | 1/1970 | Gerhardt et al. | 252/300 |
| 5,200,116 | A * | 4/1993 | Heller | 252/586 |
| 5,770,115 | A * | 6/1998 | Misura | 252/586 |
| 6,060,543 | A | 5/2000 | Bolle et al. | 524/100 |
| 6,117,995 | A * | 9/2000 | Zedda et al. | 544/207 |
| 6,255,483 | B1 * | 7/2001 | Fletcher et al. | 544/216 |
| 6,547,390 | B1 * | 4/2003 | Bernheim et al. | 351/163 |
| 6,802,993 | B2 | 10/2004 | Momoda et al. | 252/586 |
| 2002/0083641 | A1 | 7/2002 | Leppard et al. | 47/29.4 |

FOREIGN PATENT DOCUMENTS

| | | |
|---|---|---|
| EP | 0704437 | 4/1996 |
| GB | 2377222 | 1/2003 |

OTHER PUBLICATIONS

M. Mennig et al, Thin Solid Films, vol. 351, pp. 230-234, (No month listed, 1999).
J. C. V. P. Moura, et al, Dyes and Pigments, vol. 33, No. 3, pp. 173-196, (1997), (accepted May 23, 1996).
Patent Abstracts of Japan Publication No. 2000008030, Publication Date: Jan. 11, 2000.

* cited by examiner

*Primary Examiner* — Bijan Ahvazi
(74) *Attorney, Agent, or Firm* — Tyler A. Stevenson

(57) ABSTRACT

Photochromic compositions are disclosed comprising a polymeric material, a photochromic dye, a hydroxyphenyl triazine UV absorber and, optionally, a further light stabilizer selected from the sterically hindered amines. These systems provide a reversible photochromic effect and show improved light stabilization and color fastness.

10 Claims, No Drawings

STABILIZATION OF PHOTOCHROMIC SYSTEMS

This application is a continuation of application No. 10/572,154, filed Mar. 16, 2006, abandoned, which is the National Stage of International Application PCT/EP04/052238, filed Sep. 20, 2004, the contents of which are entirely incorporated by reference.

The present invention relates to light stabilized polymer compositions comprising a photochromic dye, to a process of improving the stability and/or colour fastness of a photochromic dye, and to the use of a certain stabilizer for improving the light fastness of photochromic dyes or compositions containing them.

Photochromic systems comprise molecules able to change the color due to a reversible transformation of a chemical species induced by daylight.

Typical photochromic systems employ naphtho- or benzopyrans (chromenes), spiropyrans, spirooxazines. These molecules have found several fields of application especially in plastics (e.g. ophthalmic lenses). One of the most severe limitations to a large scale employment of such devices is due to the intrinsically poor long term stability, e.g. the photostability of both colorless and colored forms under conditions of more or less continuous irradiation with daylight. WO 96/37576 notes some stabilization of these systems using certain light stabilizers.

U.S. Pat. No. 5,770,115 pertains to compositions of a carrier photochromic naphthopyran material and a stabilizer system comprising a polyphenolic antioxidant, a ultraviolet light absorber and a hindered amine light stabilizer. The stabilizer system is used to improve the fatigue resistance of the photochromic naphthopyran compounds.

It has now been found that an improved light stabilization and color fastness of photochromic systems and the dyes used, e.g. of marks and colorations on polymeric materials such as plastics and elastomers, may be achieved using a specific UV absorber and optional further stabilizer.

The UV absorbers are selected from the family of hydroxyphenyltriazines; thus, present invention pertains to a composition comprising a) a polymeric material containing
b) a photochromic dye and
c) a stabilizer comprising a hydroxyphenyl triazine UV absorber (i) conforming to formula I, II, III, IV or V

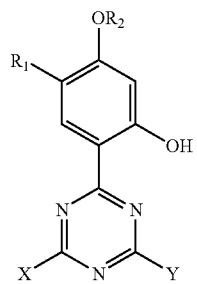

I

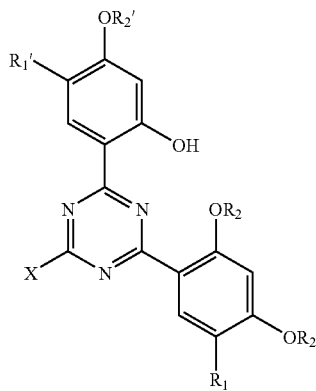

II

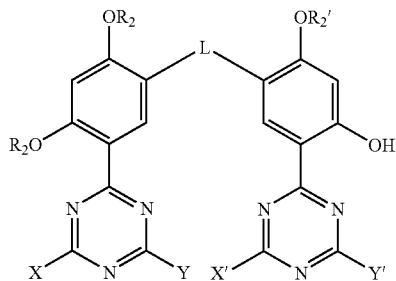

III

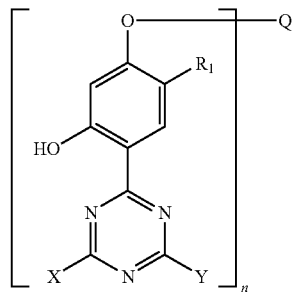

IV

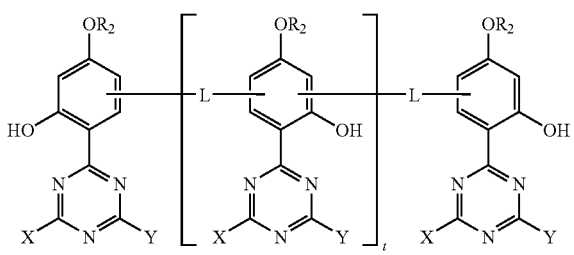

V wherein
Y is phenyl, naphthyl, or said phenyl or said naphthyl substituted by one to three alkyl of 1 to 6 carbon atoms, by halogen, by hydroxy or by alkoxy of 1 to 6 carbon atoms or by mixtures thereof; or Y is $Z_1$ or $Z_2$;

X is $Z_1$ or $Z_2$;

$R_1$ is hydrogen, straight or branched chain alkyl of 1 to 24 carbon atoms, cycloalkyl of 5 to 12 carbon atoms, phenylalkyl of 7 to 15 carbon atoms, halogen, —$SR_3$, —$SOR_3$ or —$SO_2R_3$; or said alkyl, said cycloalkyl or said phenylalkyl substituted by one to three halogen, —$R_4$, —$OR_5$, —$N(R_5)_2$, —$COR_5$, —$COOR_5$, —$OCOR_5$, —CN, —$NO_2$, —$SR_5$, —$SOR_5$, —$SO_2R_5$ or —$P(O)(OR_5)_2$, morpholinyl, piperidinyl, 2,2,6,6-tetramethylpiperidinyl, piperazinyl or N-methylpiperidinyl groups or combinations thereof; or said alkyl or said cycloalkyl interrupted by one to four phenylene, —O—, —NR$_5$—, —CONR$_5$—, —COO—, —OCO— or —CO groups or combinations thereof; or said alkyl or said cycloalkyl both substituted and interrupted by combinations of the groups mentioned above;

R$_3$ is alkyl of 1 to 20 carbon atoms, alkenyl of 3 to 18 carbon atoms, cycloalkyl of 5 to 12 carbon atoms, phenylalkyl of 7 to 15 carbon atoms, aryl of 6 to 10 carbon atoms or said aryl substituted by one or two alkyl of 1 to 4 carbon atoms;

R$_4$ is aryl of 6 to 10 carbon atoms or said aryl substituted by one to three halogen, alkyl of 1 to 8 carbon atoms, alkoxy of 1 to 8 carbon atoms or combinations thereof; cycloalkyl of 5 to 12 carbon atoms; phenylalkyl of 7 to 15 carbon atoms or said phenylalkyl substituted on the phenyl ring by one to three halogen, alkyl of 1 to 8 carbon atoms, alkoxy of 1 to 8 carbon atoms or combinations thereof; or straight or branched chain alkenyl of 2 to 18 carbon atoms;

R$_5$ is defined as is R$_4$; or R$_5$ is also hydrogen or straight or branched chain alkyl of 1 to 24 carbon atoms, alkenyl of 2 to 24 carbon atoms; or R$_5$ is a group for formula

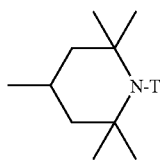

T is hydrogen, oxyl, hydroxyl, —OT$_1$, alkyl of 1 to 24 carbon atoms, said alkyl substituted by one to three hydroxy; benzyl or alkanoyl of 2 to 18 carbon atoms;

T$_1$ is alkyl of 1 to 24 carbon atoms, cycloalkyl of 5 to 12 carbon atoms, alkenyl of 2 to 24 carbon atoms, cycloalkenyl of 5 to 12 carbon atoms, phenylalkyl of 7 to 15 carbon atoms, a radical of a saturated or unsaturated bicyclic or tricyclic hydrocarbon of 7 to 12 carbon atoms or aryl of 6 to 10 carbon atoms or said aryl substituted by one to three alkyl of 1 to 4 carbon atoms;

R$_2$ is hydrogen, straight or branched chain alkyl of 1 to 24 carbon atoms or cycloalkyl of 5 to 12 carbon atoms; or said alkyl or said cycloalkyl substituted by one to four halogen, epoxy, glycidyloxy, furyloxy, —R$_4$, —OR$_5$, —N(R$_5$)$_2$, —CON(R$_5$)$_2$, —COR$_5$, —COOR$_5$, —OCOR$_5$, —OCOC(R$_5$)=C(R$_5$)$_2$, —C(R$_5$)=CCOOR$_5$, —CN, —NCO, or

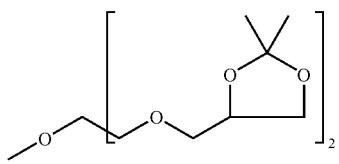

or combinations thereof; or said alkyl or said cycloalkyl interrupted by one to four epoxy, —O—, —NR$_5$—, —CONR$_5$—, —COO—, —OCO—, —CO—, —C(R$_5$)=C(R$_5$)COO—, —OCOC(R$_5$)=C(R$_5$)—, —C(R$_5$)=C(R$_5$)—, phenylene or phenylene-G-phenylene in which G is —O—, —S—, —SO$_2$—, —CH$_2$— or —C(CH$_3$)$_2$— or combinations thereof, or said alkyl or said cycloalkyl both substituted and interrupted by combinations of the groups mentioned above; or R$_2$ is —SO$_2$R$_3$ or —COR$_6$;

R$_6$ is straight or branched chain alkyl of 1 to 18 carbon atoms, straight or branched chain alkenyl of 2 to 12 carbon atoms, phenoxy, alkylamino of 1 to 12 carbon atoms, arylamino of 6 to 12 carbon atoms, —R$_7$COOH or —NH—R$_8$—NCO;

R$_7$ is alkylene of 2 to 14 carbon atoms or phenylene;

R$_8$ is alkylene of 2 to 24 carbon atoms, phenylene, tolylene, diphenylmethane or a group

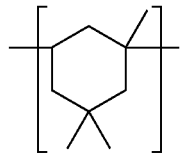

R$_1$ and R$_{1'}$ are the same or different and are as defined for R$_1$;

R$_2$ and R$_{2'}$ are the same or different and are as defined for R$_2$;

X, X' are the same or different and are as defined for X; Y and Y' are the same or different and are as defined for Y;

t is 0 to 9;

L is straight or branched alkylene of 1 to 12 carbon atoms, cycloalkylene of 5 to 12 carbon atoms or alkylene substituted or interrupted by cyclohexylene or phenylene; or L is benzylidene; or L is —S—, —S—S—, —S-E-S—, —SO—, —SO$_2$—, —SO-E-SO—, —SO$_2$-E-SO$_2$—, —CH$_2$—NH-E-NH—CH$_2$— or

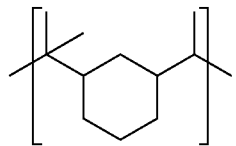

E is alkylene of 2 to 12 carbon atoms, cycloalkylene of 5 to 12 carbon atoms or alkylene interrupted or terminated by cycloalkylene of 5 to 12 carbon atoms;

n is 2, 3 or 4;

when n is 2; Q is straight or branched alkylene of 2 to 16 carbon atoms; or said alkylene substituted by one to three hydroxy groups; or said alkylene interrupted by one to three —CH=CH— or —O—; or said alkylene both substituted and interrupted by combinations of the groups mentioned above; or Q is xylylene or a group —CONH—R$_8$—NHCO—, —CH$_2$CH(OH)CH$_2$O—R$_9$—OCH$_2$CH(OH)CH$_2$—, —CO—R$_{10}$—CO—, or —(CH$_2$)$_m$—COO—R$_{11}$—OOC—(CH$_2$)$_m$—, where m is 1 to 3; or Q is

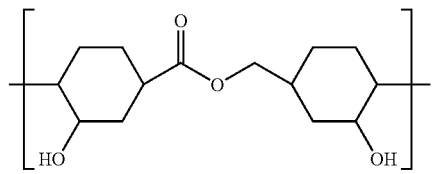

R$_9$ is alkylene of 2 to 50 carbon atoms; or said alkylene interrupted by one to ten —O—, phenylene or a group -phenylene-G-phenylene in which G is —O—, —S—, —SO$_2$—, —CH$_2$— or —C(CH$_3$)$_2$—;

R$_{10}$ is alkylene of 2 to 10 carbon atoms, or said alkylene interrupted by one to four —O—, —S— or —CH═CH—; or R$_{10}$ is arylene of 6 to 12 carbon atoms;

R$_{11}$ is alkylene of 2 to 20 carbon atoms or said alkylene interrupted by one to eight —O—;

when n is 3, Q is a group —[(CH$_2$)$_m$COO]$_3$—R$_{12}$ where m is 1 to 3, and R$_{12}$ is an alkanetriyl of 3 to 12 carbon atoms;

when n is 4, Q is a group —[(CH$_2$)$_m$COO]$_4$—R$_{13}$ where m is 1 to 3, and R$_{14}$ is an alkanetetrayl of 4 to 12 carbon atoms;

Z$_1$ is a group of formula

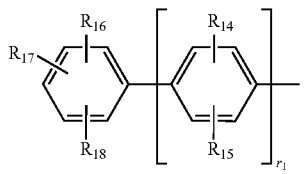

Z$_2$ is a group of formula

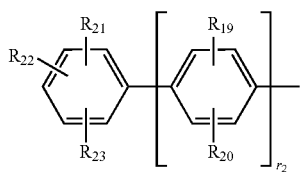

where r$_1$ and r$_2$ are 1;

R$_{14}$, R$_{15}$, R$_{16}$, R$_{17}$, R$_{18}$, R$_{19}$, R$_{20}$, R$_{21}$, R$_{22}$ and R$_{23}$ are independently of one another hydrogen, hydroxy, cyano, alkyl of 1 to 20 carbon atoms, alkoxy of 1 to 20 carbon atoms, phenylalkyl of 7 to 15 carbon atoms, cycloalkyl of 5 to 12 carbon atoms, cycloalkoxy of 5 to 12 carbon atoms, halogen, haloalkyl of 1 to 5 carbon atoms, sulfo, carboxy, acylamino of 2 to 12 carbon atoms, acyloxy of 2 to 12 carbon atoms, alkoxycarbonyl of 2 to 12 carbon atoms or aminocarbonyl; or R$_{17}$ and R$_{18}$ or R$_{22}$ and R$_{23}$ together with the phenyl radical to which they are attached are a cyclic radical interrupted by one to three —O— or —NR$_5$—.

In another embodiment of the instant invention, the s-triazine UV absorbers are those of formula I where X and Y are Z$_1$ or Z$_2$;

R$_1$ is hydrogen, straight or branched chain alkyl of 1 to 24 carbon atoms, cycloalkyl of 5 to 12 carbon atoms, phenylalkyl of 7 to 15 carbon atoms or halogen;

R$_2$ is hydrogen, straight or branched chain alkyl of 1 to 24 carbon atoms or cycloalkyl of 5 to 12 carbon atoms; or said alkyl or said cycloalkyl substituted by one to three —R$_4$, —OR$_5$, —COOR$_5$, —OCOR$_5$ or combinations thereof; or said alkyl or cycloalkyl interrupted by one to three epoxy, —O—, —COO—, —OCO— or —CO—;

R$_4$ is aryl of 6 to 10 carbon atoms or said aryl substituted by one to three halogen, alkyl of 1 to 8 carbon atoms, alkoxy of 1 to 8 carbon atoms or combinations thereof; cycloalkyl of 5 to 12 carbon atoms; phenylalkyl of 7 to 15 carbon atoms or said phenylalkyl substituted on the phenyl ring by one to three halogen, alkyl of 1 to 8 carbon atoms, alkoxy of 1 to 8 carbon atoms or combinations thereof;

R$_5$ is defined as is R$_4$; or R$_5$ is also hydrogen or straight or branched chain alkyl of 1 to 24 carbon atoms;

Z$_1$ is a group of formula

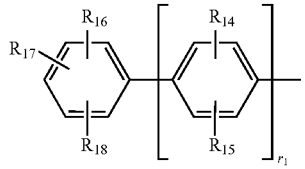

Z$_2$ is a group of formula

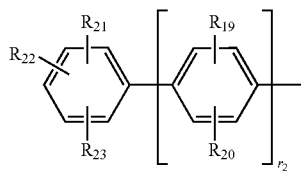

where r$_1$ and r$_2$ are each 1; and

R$_{14}$, R$_{15}$, R$_{16}$, R$_{17}$, R$_{18}$, R$_{19}$, R$_{20}$, R$_{21}$, R$_{22}$ and R$_{23}$ are independently of one another hydrogen, hydroxy, cyano, alkyl of 1 to 20 carbon atoms, alkoxy of 1 to 20 carbon atoms, phenylalkyl of 7 to 15 carbon atoms, cycloalkyl of 5 to 12 carbon atoms, cycloalkoxy of 5 to 12 carbon atoms, halogen, haloalkyl of 1 to 5 carbon atoms, sulfo, carboxy, acylamino of 2 to 12 carbon atoms, acyloxy of 2 to 12 carbon atoms, or alkoxycarbonyl of 2 to 12 carbon atoms or aminocarbonyl.

Preferred are, for example, those conforming to the general structure

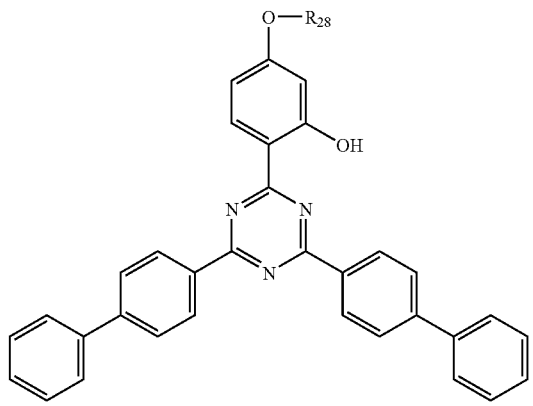

wherein

R$_{28}$ is (CH$_2$—CH$_2$—O—)$_n$—R$_{29}$; —CH$_2$—CH(OH)—CH$_2$—O—R$_{29}$; or —CH(R$_{30}$)—CO—O—R$_{40}$; n is 0 or 1; R$_{29}$ is C$_1$-C$_{13}$alkyl or C$_2$-C$_{20}$alkenyl or C$_6$-C$_{12}$aryl or CO—C$_1$-C$_{18}$alkyl; R$_{30}$ is H or C$_1$-C$_8$alkyl; R$_{40}$ is C$_1$-C$_{12}$alkyl or C$_2$-C$_{12}$alkenyl or C$_5$-C$_6$cycloalkyl.

A further example of hydroxyphenyltriazines (i) is the compound (a)

a) 2-(2-hydroxy-4-[2-ethylhexyl]oxyphenyl)-4,6-di(4-phenylphenyl)-1,3,5-triazine, Compound UV1 as used in the examples below is identical with the above compound a (also disclosed as compound A8 of U.S. Pat. No. 6,060,543).

Hydroxyphenyl triazine UV absorber are described e.g. in GB-A-975966, EP-A-434608, U.S. Pat. Nos. 4,619,956, 5,298,067, EP-A-530135, EP-A-520938, EP-A-531258, U.S. Pat. Nos. 5,556,973, 5,959,008, 6,184,375, 6,117,997; for example in U.S. Pat. Nos. 5,998,116, 6,255,483, 6,060,543.

Of interest are also such compositions wherein the hydroxyphenyl triazine UV absorber (i) is an oligo- or polyester of formula (100)

   (100)

in which
$x_2$ is a number from 1 to 50;
$A_1$ is a group of the formula (101)

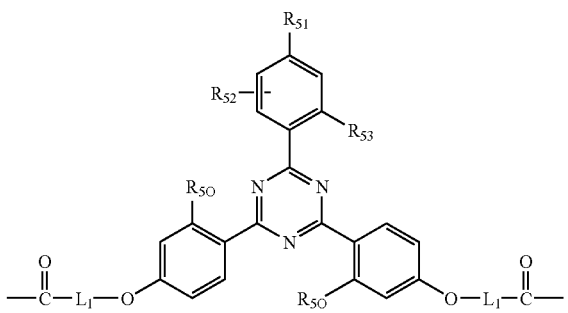   (101)

or has one of the meanings given for $T_{10}$;
$D_1$ is $C_4$-$C_{12}$ alkylene or said alkylene substituted by OH or interrupted by O or both substituted by OH and interrupted by O;
$L_1$ is $C_1$-$C_{18}$alkylene; $C_5$-$C_{12}$cycloalkylene; $C_3$-$C_{18}$alkenylene; or one of said residues substituted by phenyl, $C_7$-$C_{11}$alkylphenyl, $C_5$-$C_{12}$cycloalkyl, OH, halogen, $C_1$-$C_{18}$alkoxy, $C_5$-$C_{12}$cycloalkoxy, $C_3$-$C_{18}$alkenyloxy, COOH;
the $R_{50}$ are independently of each other H, $OR_{54}$ or OH, with the proviso that at least one of $R_{50}$ or $R_{53}$ is OH;
the $R_{54}$ are independently of each other hydrogen, $C_1$-$C_{12}$alkyl or a radical of formula $-L_1$-CO—O—$R_{55}$;
$R_{55}$ is H, $C_1$-$C_{18}$alkyl, $C_2$-$C_{12}$hydroxyalkyl;
$R_{51}$ is hydrogen, $C_1$-$C_4$alkyl, Cl, phenyl or a group —$OR_{54}$;
$R_{52}$ is hydrogen or methyl;
$R_{53}$ is hydrogen, methyl, OH or $OR_{54}$; and
$T_{10}$ is the divalent acyl residue of an aliphatic or cycloaliphatic dicarboxylic acid of 13 to 60 carbon atoms; and which contains at least one moiety of formula (101) and at least one moiety $T_{10}$.

In a preferred compound, $L_1$ is $C_1$-$C_4$alkylene, especially $C_2$-$C_4$alkylidene or methylene. $D_1$ is advantageously $C_4$-$C_{12}$alkylene or $C_4$-$C_{10}$alkylene interrupted by O.

$T_{10}$ as the divalent acyl residue of an aliphatic or cycloaliphatic dicarboxylic acid of 13 to 60 carbon atoms includes, for example, aliphatic diacyls wherein the 2 carbonyl groups are interconnected by $C_{11}$-$C_{58}$alkylene or -alkenylene or alkylene interrupted by cycloalkylene or cycloalkenylene, each of which is unsubstituted or substituted by alkyl, and containing 11 to 58 carbon atoms in total, preferably 20 to 50 carbon atoms. Alkylene or alkenylene may be branched or unbranched, or, preferably not adjacent to an ethylenic double bond, interrupted by oxygen. In preferred compounds, $T_{10}$ is —CO-$T_{10'}$-CO—, wherein $T_{10'}$ is $C_{20}$-$C_{50}$allylene or $C_{20}$-$C_{50}$alkylene interrupted by one or more oxygen atoms; especially preferred is unbranched $C_{20}$-$C_{50}$alkylene. In further preferred compounds, $T_{10}$ is —CO-$T_{10'}$-CO—, wherein $T_{10'}$ is alkylene interrupted by $C_5$-$C_{12}$cycloalkylene or $C_5$-$C_{12}$cycloalkenylene or said cycloalkylene or cycloalkenylene substituted by alkyl and containing 11 to 58 carbon atoms, especially 20-50 carbon atoms, in total; especially preferred cycloalkylene is cyclohexylene; especially preferred cycloalkenylene is cyclohexenylene. Valuable spacer groups $T_{10'}$ are, for example, of the formula 102

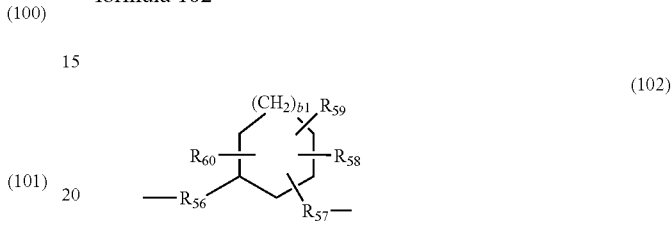   (102)

wherein $R_{56}$ is —($C_bH_{2b}$)— and $R_{57}$ is —($C_cH_{2c}$)— and $R_{58}$, $R_{59}$ and $R_{60}$ are —($C_dH_{2d}$)—H, —($C_eH_{2e}$)—H, and —($C_fH_{2f}$)—H, respectively, where $b_1$ is from the range 0-7, and each of the indices b-f is from the range 0-20, with the condition that the sum $b_1+b+c+d+e+f$ is from the range 15-45, or of the formula 103

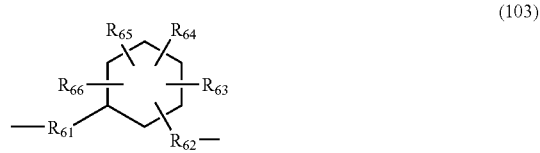   (103)

wherein
$R_{61}$ and $R_{62}$ each are $C_1$-$C_{18}$alkylene and each of $R_{63}$, $R_{64}$, $R_{65}$ and $R_{66}$, independently, are H or $C_1$-$C_{18}$alkyl, and $R_{65}$ and $R_{66}$ together may also be a chemical bond, with the condition that the total number of carbon atoms in formula 103 ranges from 20 to 50.

Of special technical importance are spacer groups $T_{10'}$ of the formula 103 wherein $R_{61}$ and $R_{62}$ independently are alkylene of 4-12 carbon atoms, each of $R_{63}$ and $R_{64}$, independently, are $C_4$-$C_{12}$alkyl, while $R_{65}$ and $R_{66}$ are hydrogen.

In the compounds of present formula (100), most preferably, the $R_{50}$ are OH;
the $R_{54}$ are hydrogen or methyl;
$R_{51}$ is hydrogen, methyl or a group —$OR_{54}$;
$R_{52}$ is hydrogen;
$R_{53}$ is hydrogen, OH or methyl.

Terminal groups of the oligomer or polymer of formula (100) usually are —O-$D_1$-$OR_{67}$, or —$OR_{67}$ if bonded to $A_1$ (left side of formula 100), or -$A_1$-$OR_{67}$, such as -$T_{10'}$-$COOR_{67}$ or -[formula 101]-$OR_{67}$, or —$R_{67}$ if bonded to O (right side of formula 100), where $R_{67}$ is H or $C_1$-$C_8$alkyl.

For example, the ester of formula (100) may conform to the formula (104)

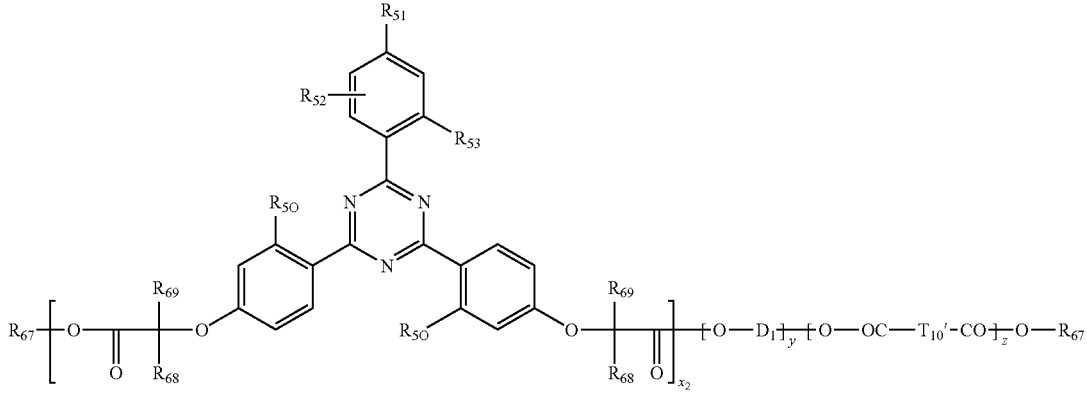

(104)

in which
$x_2$ is a number from 1 to 20;
the number y is at least 1 and ranges from $(x_2+z-1)$ to $(x_2+z+1)$;
z is a number from 1 to 20; and
$R_{68}$ is hydrogen, $C_1$-$C_{12}$alkyl; $C_5$-$C_{12}$cycloalkyl; $C_2$-$C_{12}$alkenyl; phenyl; $C_7$-$C_{11}$alkylphenyl; $C_1$-$C_{12}$alkyl substituted by phenyl, OH, halogen; $C_1$-$C_{18}$alkoxy, $C_5$-$C_{12}$cycloalkoxy, $C_3$-$C_{18}$alkenyloxy or COOH; especially hydrogen or $C_1$-$C_4$alkyl;
$R_{67}$ is hydrogen or $C_1$-$C_8$alkyl;
$R_{69}$ is hydrogen or $C_1$-$C_4$alkyl;
$D_1$ is $C_4$-$C_8$alkylene or $C_4$-$C_{10}$alkylene interrupted by O; and $T_{10'}$ is $C_{20}$-$C_{50}$alkylene or $C_{20}$-$C_{50}$alkylene interrupted by one or more oxygen atoms;
and all other symbols are as defined for formula 100 above.

$T_{10'}$ may also be alkylene interrupted by $C_5$-$C_{12}$cycloalkylene or said cycloalkylene, especially cyclohexylene, substituted by alkyl and containing 20-50 carbon atoms in total.

In the oligo- or polyester of formula (104), each of the divalent structural units identified by the indices $X_2$ and z bond to the structural unit —O-$D_1$- identified by the index y, and/or to an end group $R_{67}$ or $OR_{67}$.

In compounds of the formula (100), $X_2$ is preferably from the range 2-50, more preferably from the range 2-20, especially 4-12; the number of triazine moieties of the formula 101 to diacid residues $T_{10}$ preferably ranges from about 1:3 to about 10:1, more preferably from about 1:1 to about 5:1. In compounds of the formula (104), each of $X_2$ and z are preferably from the range 1-16; more preferably, $X_2$ is from the range 1-10 and z is ranging from 2-12.

Oligomeric or polymeric esters of the invention such as those of formula 100 or 104 usually have a molecular weight within the range 1000 to 50000 g/mol, more preferably 1500 to 20000 g/mol, most preferably 2000 to 10000 g/mol (number average Mn as determined by gel permeation chromatography GPC).

Alkylphenyl is alkyl-substituted phenyl; $C_7$-$C_{14}$alkylphenyl embraces examples such as methylphenyl (tolyl), dimethylphenyl (xylyl), trimethylphenyl (mesityl), ethylphenyl, propylphenyl, butylphenyl, dibutylphenyl, pentylphenyl, hexylphenyl, heptylphenyl and octylphenyl.

Phenylalkyl is phenyl-substituted alkyl; $C_7$-$C_{11}$phenylalkyl embraces examples such as benzyl, α-methylbenzyl, α-ethylbenzyl, α,α-dimethylbenzyl, phenylethyl, phenylpropyl, phenylbutyl and phenylpentyl.

Alkyl interrupted by O can generally comprise one or more nonadjacent oxygen atom(s). Preferably, a carbon atom of an alkylene chain such as D, or $T_{10'}$ bonds to not more than 1 heteroatom.

Within the scope of the stated definitions, the alkyl radicals are branched or unbranched alkyl such as methyl, ethyl, propyl, isopropyl, n-butyl, sec-butyl, isobutyl, t-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3, 3,5,5-hexamethylhexyl, tridecyl, tetradecyl, pentadecyl, hexadecyl, heptadecyl and octadecyl.

Alkylene such as of $L_1$ or $D_1$ derives from such alkyls by abstraction of an hydrogen atom.

Within the scope of the stated definitions, the alkenyl radicals include allyl, isopropenyl, 2-butenyl, 3-butenyl, isobutenyl, n-penta-2,4-dienyl, 3-methyl-but-2-enyl; n-oct-2-enyl, n-dodec-2-enyl, isododecenyl, n-octadec-2-enyl and n-octadec-4-enyl.

The heavy chains of $T_{10}$, e.g. alkylene groups of $T_{10'}$, may have a certain molecular distribution around their main component. Ranges may be, for example, from 22-26, 28-32 or 34-38 C-atoms. It is however also possible that broader ranges are used such as for example from 20 to 40, from 30 to 50 or from 30 to 40 carbon atoms, each for $T_{10'}$ in total.

Since the educts for preparing a compound of formula (100) or (104) are commercial products, they may vary within certain specifications. This is particularly the case for high molecular weight diacids from which the $T_{10}$ groups are derived, when $T_{10}$ is $C_{20}$-$C_{60}$alkylene (which may be interrupted as described above).

Commercially available diacids or diacid esters may also contain small amounts of chains below $C_{20}$. Therefore mixtures of compounds wherein $T_{10}$ is a mixture containing up to 10% of diacyl chains below 20 carbon atoms and 90 to 100% of diacyl chains between 20 and 60, particularly between 20 and 40 carbon atoms are also subject of the invention. Percentage is weight percent, based on the total mixture.

Present invention also pertains to an oligoester or polyester which is obtained by reacting a tris-aryl-triazine of the formula (105)

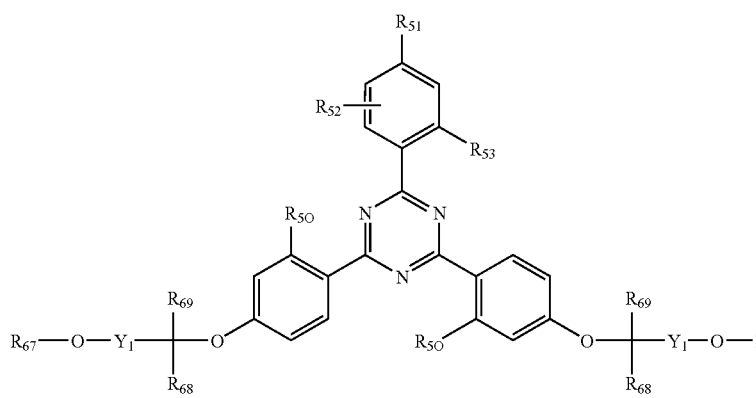

(105)

and a compound of the formula $R_{67}$—O-$T_{10}$-O—$R_{67}$, where $Y_1$ is CO and all other all symbols are as defined above, with a diol HO-$D_1$-OH.

Hydroxyphenyl triazine UV absorber (i) of formula (100)-(105) may be prepared as described in the international patent application with application no. EP2004/050804.

Preference is given to hydroxyphenyl triazine UV absorber (i) of the formula I, II, III, IV or V.

Preferred further light stabilizers to be employed are sterically hindered amines (HALS), especially selected from oligomeric and monodispersed HALS, oligomeric HALS of the alkoxyamine class (NOR-HALS), and low basicity HALS like piperazinones (such as products described in WO 00/31069), morpholinones (see WO 99/14206), piperazinediones (see DE-A-19924984), and thioimidazolidinones (see WO 01/62739).

Thus, present invention specifically pertains to a composition comprising
  a) a polymeric material containing
  b) a photochromic dye and
  c) a stabilizer combination of
    i) a hydroxyphenyl triazine UV absorber and
    ii) at least one further light stabilizer selected from the sterically hindered amines (HALS).

The compositions of the invention are useful for all applications wherein a photochromic effect is to be achieved. Some examples are described below:

Optical devices such as particular types of ophthalmic lenses, referred to as "photochromatic", where the beneficial neutralization of harmful UV solar radiation and the anti-glare effect are effective only when needed, allowing the use of the sunglasses with the photochromatic lenses also indoor. Such lenses are often made of polyacrylates, cellulose esters, polyvinylalcohol, polyurethanes, polycarbonates, polyesters such as polyethyleneterephtalates, polyvinylbutyrate, polystyrenes and related copolymers such as styrene-methacrylate or styrene-acrylonitrile. The systems may further be applied in optical films as seen in WO 97/32225, and U.S. Pat. Nos. 4,871,784 and 5,217,794 which are incorporated herein by reference.

Additional applications can be in the field of glazing, where filtration of visible light triggered by the UV part of the solar radiation may enhance the comfort inside a building or vehicle and/or contribute to reduce costs for conditioning an indoor environment. The photochromic system can be present either in the plastic window or used in a film that is laminated onto or embedded in a glass or plastic window. Typical materials used in these contexts are polyethyleneterephtalate, glycole modified polyethyleneterephtalate, polycarbonate, polymethylmethacrylate, polyvinylbutyral, and/or as described in WO 92/01557, Japanese Nos. 75-33286; 93-143668; 95-3217 and 96-143831, and U.S. Pat. No. 5,643,676 which is incorporated herein by reference, for films and glazings; or as seen in Japanese Nos. 80-40018; 90-192118; 90-335037; 90-335038; 92-110128 and 94-127591, and U.S. Pat. No. 5,618,863 which is incorporated herein by reference, for windscreens/vehicle glazings and intermediate layers.

Also greenhouse plastic covers can be additivated with photochromes, aiming at reducing light intensity inside the greenhouse, that eventually turns into heat, as excessive heat may be detrimental to some crops and/or inhibit growth. Low density polyethylene, linear low density polyethylene, ethylene-vinyl acetate copolymer (EVA) and ethylene-butyl acrylate copolymer and blends of the mentioned polymers are typical materials for plastic covers used in agriculture.

Photochromic coatings.

Construction elements or articles containing photochromic parts for the purpose of labelling, signalling, decoration etc.

In general, the polymeric material of component a) may be selected from polymers listed below:

1. Polymers of monoolefins and diolefins, for example polypropylene, polyisobutylene, polybut-1-ene, poly-4-methylpent-1-ene, polyvinylcyclohexane, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:

a) radical polymerisation (normally under high pressure and at elevated temperature).

b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COC), ethylene/1-olefins copolymers, where the 1-olefin is gene-rated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EVA and alternating or random polyal-kylene/carbon monoxide copolymers and mixtures thereof with other polymers, for example polyamides.

4. Hydrocarbon resins (for example $C_5$-$C_9$) including hydrogenated modifications thereof (e.g. tackifiers) and mixtures of polyalkylenes and starch.

Homopolymers and copolymers from 1.)-4.) may have any stereostructure including syndiotactic, isotactic, hemi-isotactic or atactic; where atactic polymers are preferred. Stereoblock polymers are also included.

5. Polystyrene, poly(p-methylstyrene), poly(α-methylstyrene).

6. Aromatic homopolymers and copolymers derived from vinyl aromatic monomers including styrene, α-methylstyrene, all isomers of vinyl toluene, especially p-vinyltoluene, all isomers of ethyl styrene, propyl styrene, vinyl biphenyl, vinyl naphthalene, and vinyl anthracene, and mixtures thereof. Homopolymers and copolymers may have any stereostructure including syndiotactic, isotactic, hemi-isotactic or atactic; where atactic polymers are preferred. Stereoblock polymers are also included.

6a. Copolymers including aforementioned vinyl aromatic monomers and comonomers selected from ethylene, propylene, dienes, nitriles, acids, maleic anhydrides, maleimides, vinyl acetate and vinyl chloride or acrylic derivatives and mixtures thereof, for example styrene/butadiene, styrene/acrylonitrile, styrene/ethylene (interpolymers), styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

6b. Hydrogenated aromatic polymers derived from hydrogenation of polymers mentioned under 6.), especially including polycyclohexylethylene (PCHE) prepared by hydrogenating atactic polystyrene, often referred to as polyvinylcyclohexane (PVCH).

6c. Hydrogenated aromatic polymers derived from hydrogenation of polymers mentioned under 6a.).

Homopolymers and copolymers may have any stereostructure including syndiotactic, isotactic, hemi-isotactic or atactic; where atactic polymers are preferred. Stereoblock polymers are also included.

7. Graft copolymers of vinyl aromatic monomers such as styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfo-chlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from α,β-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.
11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.
12. Homopolymers and copolymers of cyclic ethers such as polyalkylene glycols, polyethylene oxide, polypropylene oxide or copolymers thereof with bisglycidyl ethers.
13. Polyacetals such as polyoxymethylene and those polyoxymethylenes which contain ethylene oxide as a comonomer; polyacetals modified with thermoplastic polyurethanes, acrylates or MBS.
14. Polyphenylene oxides and sulfides, and mixtures of polyphenylene oxides with styrene polymers or polyamides.
15. Polyurethanes derived from hydroxyl-terminated polyethers, polyesters or polybutadienes on the one hand and aliphatic or aromatic polyisocyanates on the other, as well as precursors thereof.
16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).
17. Polyureas, polyimides, polyamide-imides, polyetherimids, polyesterimids, polyhydantoins and polybenzimidazoles.
18. Polyesters derived from dicarboxylic acids and diols and/or from hydroxycarboxylic acids or the corresponding lactones, for example polyethylene terephthalate (PET), polybutylene terephthalate, poly-1,4-dimethylolcyclohexane terephthalate, polyalkylene naphthalate (PAN) and polyhydroxybenzoates, as well as block copolyether esters derived from hydroxyl-terminated polyethers; and also polyesters modified with polycarbonates or MBS. Specific examples are PET, polybutylene terephthalate (PBT), polyethylenenaphthalenate (PEN), polytrimethylene terephthalate (PTT), and their copolyesters, for example with isophthalic acid, di-ethylene glycol, 1,4-bis(hydroxymethyl)cyclohexane.
19. Polycarbonates and polyester carbonates.
20. Polyketones.
21. Polysulfones, polyether sulfones and polyether ketones.
22. Crosslinked polymers derived from aldehydes on the one hand and phenols, ureas and melamines on the other hand, such as phenol/formaldehyde resins, urea/formaldehyde resins and melamine/formaldehyde resins.
23. Drying and non-drying alkyd resins.
24. Unsaturated polyester resins derived from copolyesters of saturated and unsaturated dicarboxylic acids with polyhydric alcohols and vinyl compounds as crosslinking agents, and also halogen-containing modifications thereof of low flammability.
25. Crosslinkable acrylic resins derived from substituted acrylates, for example epoxy acrylates, urethane acrylates or polyester acrylates.
26. Alkyd resins, polyester resins and acrylate resins crosslinked with melamine resins, urea resins, isocyanates, isocyanurates, polyisocyanates or epoxy resins.
27. Crosslinked epoxy resins derived from aliphatic, cycloaliphatic, heterocyclic or aromatic glycidyl compounds, e.g. products of diglycidyl ethers of bisphenol A and bisphenol F, which are crosslinked with customary hardeners such as anhydrides or amines, with or without accelerators.
28. Natural polymers such as cellulose, rubber, gelatin and chemically modified homologous derivatives thereof, for example cellulose acetates, cellulose propionates and cellulose butyrates, or the cellulose ethers such as methyl cellulose; as well as rosins and their derivatives.
29. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

Polymeric material useable for the present invention is preferably synthetic organic polymeric material, for example, material commonly used for electronic applications.

In particular the following polymers are preferred:

Polyolefines such as polyethylene and polypropylene, polycarbonate, polyesters such as polyethylene terephthalate (PET) and its copolyesters; styrene polymers or copolymers such as polystyrene or high impact polystyrene (PS-HIPS); or the specific polymers mentioned above.

The photochromic dye is usually selected from naphtho- and benzopyranes (chromenes), or from spiropyranes or spirooxazines; these components are commercial available.

Photochromic spiro-indolino-oxazine compounds useful in the invention have the general structural formula (I'):

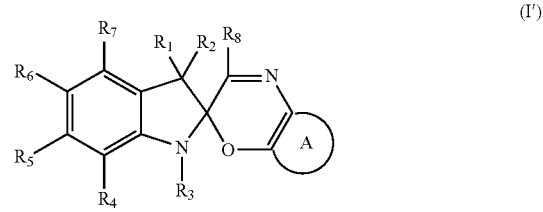

where:
$R_1$ and $R_2$, either the same or different, each represent independently a $C_1$-$C_5$alkyl group, linear or branched; a phenyl group; or $R_1$ and $R_2$, together with the carbon atom to which they are connected, jointly represent a cycloalkyl ($C_4$-$C_7$)group, bicycloalkyl($C_1$-$C_{11}$)group, or tricycloalkyl ($C_7$-$C_{13}$)group;
$R_3$ represents a hydrogen atom; a $C_1$-$C_5$alkyl group, linear or branched; a similar $C_1$-$C_5$alkyl group substituted with from 1 to 5 halogen atoms chosen from fluorine, chlorine, bromine or iodine, hydroxy groups, $C_1$-$C_5$alkoxy groups, $C_1$-$C_5$-carboxy alkyl groups, cyano groups; a $C_2$-$C_5$alkenyl group; a phenyl group; or benzyl group;

from $R_4$ to $R_7$, either the same or different, each stand independently for a hydrogen atom; a $C_1$-$C_5$alkyl group, linear or branched; a similar $C_1$-$C_5$alkyl group substituted with from 1 to 5 halogen atoms chosen from fluorine, chlorine, bromine or iodine, hydroxy groups, $C_1$-$C_5$alkoxy groups, $C_1$-$C_5$-carboxy alkyl groups, cyano groups; a $C_2$-$C_5$alkenyl group; a phenyl group; a benzyl group; a halogen atom chosen from either fluorine, chlorine, bromine or iodine; a hydroxy group; a $C_1$-$C_5$alkoxy group; an amino group; a monoalkyl($C_1$-$C_5$)amino group; a dialkyl ($C_1$-$C_5$)amino group; a cyclo-alkyl($C_3$-$C_{10}$)amino group; a piperidine, piperazine or morpholine group; a carboxyl group; a carboxy alkyl($C_1$-$C_5$)group; a carboxy alkenyl ($C_2$-$C_5$)group; a carboxamide group; a substituted carboxamide N-alkyl($C_1$-$C_5$)group; a substituted carboxamide N,N-di-alkyl($C_1$-$C_5$)group; a cyano group; a nitro group; a sulfonic group; a ($C_1$-$C_5$)alkyl sulfonic group; an aryl sulfonic group chosen from benzene sulfonic, p-toluene sulfonic, p-chlorotoluene sulfonic groups; an aryl group chosen from phenyl, biphenyl, naphthyl groups;

$R_8$ represents a hydrogen atom; a linear or branched alkyl($C_1$-$C_5$)group; a phenyl group; a halogen atom chosen from either fluorine, chlorine, bromine; an alkoxy($C_1$-$C_5$)group; or a phenoxy group;

A represents an arsenic, monocyclic or polycyclic group, chosen from those that can be defined with formula (II'), (III'), (IV') or (V'):

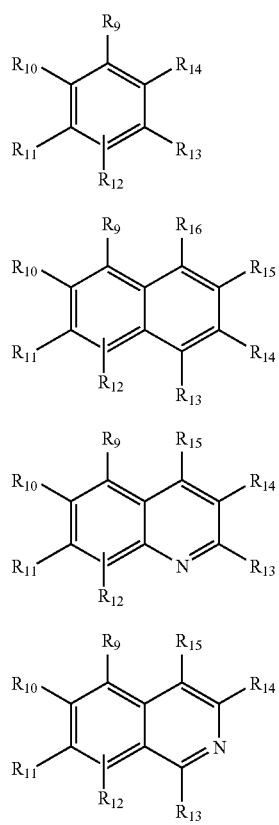

two contiguous points from $R_9$ to $R_{12}$ represent the condensation position between the oxazinic nucleus in the general formula (I') and the other two groups and $R_{13}$-$R_{16}$ have the same meaning as $R_4$-$R_7$ in the general formula (I'); or two contiguous groups together are alkylene of 3-6 carbon atoms, or a corresponding azaalkylene or oxaalkylene; or three contiguous groups jointly represent an alkane-triyl, i.e. 3-valent saturated hydrocarbon residue, of 4-8 carbon atoms, or a corresponding aza- or oxa-alkane-triyl.

In the oxa- or aza-residues, one of the carbon atoms, along with bonding hydrogens, if present, are replaced by oxygen, nitrogen or NH.

Preferably in formula (I'):

$R_1$ and $R_2$, either the same or different, each represent independently a methyl, ethyl, propyl or phenyl group, or together with the carbon atom to which they are connected, jointly represent a cyclohexyl group or a bi- or tricycloalkyl of 7-11 carbon atoms;

$R_3$ represents a methyl, ethyl, propyl, phenyl, benzyl, 2-allyl, 2-hydroxyethyl or 2-carboxymethyl group;

from $R_4$ to $R_7$, either the same or different, each stand independently for the hydrogen atom, a fluorine, chlorine or bromine atom, or a methyl, isopropyl, trifluoromethyl, hydroxymethyl, benzyl, hydroxy, methoxy, amino, piperidino, morpholino, carboxyl, carboxymethyl, N,N-dimethylcarboxamide, cyano, nitro or phenyl group;

$R_8$ represents the hydrogen atom, the chlorine atom, methyl, phenyl, or methoxy group; and/or A is one of the groups with formula (II'), (III'), (IV') or (V') where:

two contiguous points from $R_9$ to $R_{12}$ represent the condensation position between the oxazinic nucleus in the general formula (I') and the other two groups in addition to $R_{13}$-$R_{16}$ each represent independently the hydrogen atom, a fluorine, chlorine or bromine atom, or a methyl, ethyl, propyl, isopropyl, trifluoromethyl, hydroxymethyl, benzyl, hydroxy, methoxy, amino, piperidino, morpholino, carboxyl, carboxymethyl, N,N-dimethylcarboxamide, cyano, nitro or phenyl group.

Specific examples of preferred spiro-indolino-oxazine photochromic compounds useful in the present invention are:

1',3'-dihydro-5,7-dimethoxy-1'n-propyl-3'ethyl-3',4',5'-(and 3',5',6')-trimethyl-spiro[2H-1,4-benzoxazine-2,2'-[2H]indole] (VI');

1,3-dihydro-1,3,3,4,5-(and 1,3,3,5,6)-pentamethylspiro[2H-indole-2,3'-[3H]pyrido[3,2-f][1,4]benzoxazine] (VII');

1,3-dihydro-1,3,3,4,5-(and 1,3,3,5,6)-pentamethylspiro[2H-indole-2,3'-[3H]naphth[2,1-b][1,4]oxazine (VIII'):

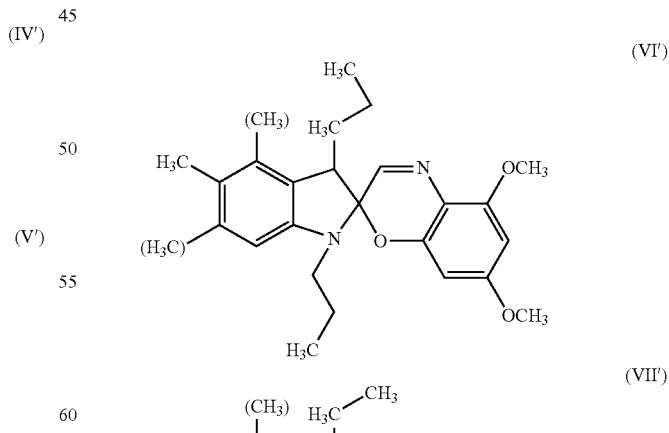

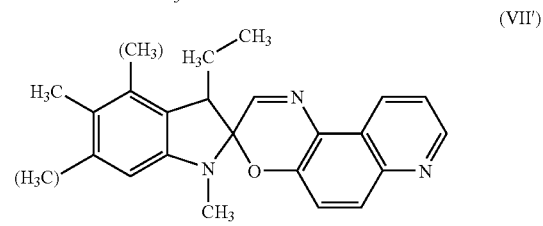

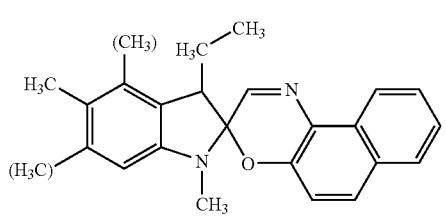
(VIII')

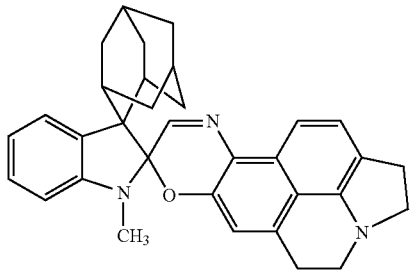

or

Naphthopyran photochromic compounds usually have the general structural formula (IX'):

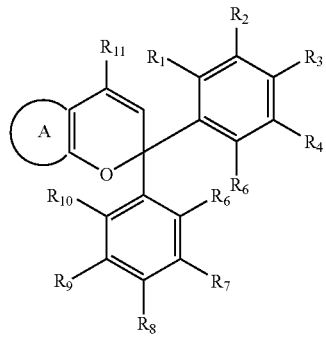
(IX')

where:

$R_1$ to $R_{11}$, either the same or different, each stand independently for a hydrogen atom; a $C_1$-$C_5$alkyl group, linear or branched; a similar $C_1$-$C_5$alkyl group substituted with from 1 to 5 halogen atoms chosen from fluorine, chlorine, bromine or iodine, hydroxy groups, $C_1$-$C_5$alkoxy groups, $C_1$-$C_5$-carboxy alkyl groups, cyano groups; a $C_2$-$C_5$alkenyl group; a phenyl group; a benzyl group; a halogen atom chosen from either fluorine, chlorine, bromine or iodine; a hydroxy group; a $C_1$-$C_5$alkoxy group; an amino group; a monoalkyl($C_1$-$C_5$)amino group; a dialkyl ($C_1$-$C_5$)amino group; a cyclo-alkyl($C_3$-$C_{10}$)amino group; a piperidine, piperazine or morpholine group; a carboxyl group; a carboxy alkyl($C_1$-$C_5$)group; a carboxy alkenyl ($C_2$-$C_5$)group; a carboxamide group; a substituted carboxamide N-alkyl($C_1$-$C_5$)group; a substituted carboxamide N,N-di-alkyl($C_1$-$C_5$)group; a cyano group; a nitro group; a sulfonic group; a ($C_1$-$C_5$)alkyl sulfonic group; an aryl sulfonic group chosen from benzene sulfonic, p-toluene sulfonic, p-chlorotoluene sulfonic groups; an aryl group chosen from phenyl, biphenyl, naphthyl groups;

A represents an arsenic polycyclic group, chosen from those that can be defined with formula (X'):

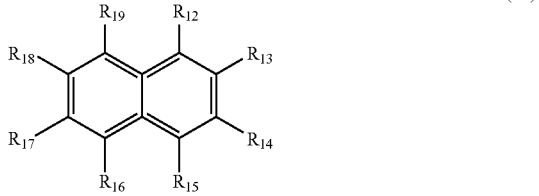
(X')

two contiguous points from $R_{12}$ to $R_{15}$ represent the condensation position between the pyran nucleus in the general formula (IX') and the other two groups in addition to $R_{16}$-$R_{19}$ have the same meaning as $R_1$-$R_{11}$ in the general formula (IX').

Preferably in formula (IX'):

$R_1$ to $R_{11}$, either the same or different, each stand independently for the hydrogen atom, a fluorine, chlorine or bromine atom, or a methyl, isopropyl, trifluoromethyl, hydroxymethyl, benzyl, hydroxy, methoxy, amino, piperidino, morpholino, carboxyl, carboxymethyl, N,N-dimethylcarboxamide, cyano, nitro or phenyl group;

A is one of the groups with formula ($X_1$) where:

two contiguous points from $R_{12}$ to $R_{15}$ represent the condensation position between the pyran nucleus in the general formula (IX') and the other two groups in addition to $R_{18}$-$R_{19}$ each represent independently the hydrogen atom, a fluorine, chlorine or bromine atom, or a methyl, ethyl, propyl, isopropyl, trifluoromethyl, hydroxymethyl, benzyl, hydroxy, methoxy, amino, piperidino, morpholino, carboxyl, carboxymethyl, N,N-dimethylcarboxamide, cyano, nitro or phenyl group.

Specific examples of preferred naphtopyran photochromic compounds useful in the present invention are:

3,3-diphenyl-3H-naphtho[2,1-b]pyran (XI');
3-(2-fluorophenyl)-3-(3-methyl-4-methoxyphenyl)-5-acetoxy-3H-naphtho[2,1-b]pyran (XII'):

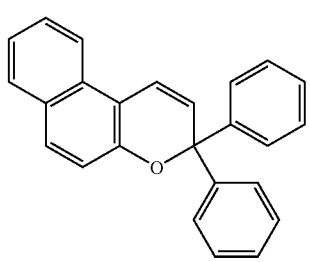
(XI')

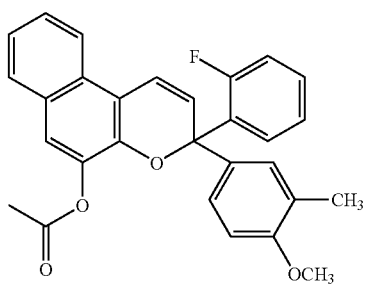
(XII')

3(2-fluorophenyl)-3-(4-methoxyphenyl)-3H-naphtho[2,1-b]pyran;

3(2-fluorophenyl)-3(4'-methoxyphenyl)-8-methoxy-3H-naptho[2,1-b]pyran;

3(2,4-dimethoxyphenyl)-3,4'-methoxyphenyl)-3H-naphto[2,1-b]pyran;

3(2-fluorophenyl-3(3,4-dimethoxyphenyl)₃H-naptho[2,1-b]pyran;

3(2-methyl-4-methoxyphenyl)-3-(4-methoxyphenyl)-3H-naphto[2,1-b]pyran;

3-(2-methylphenyl)-3(4-methoxyphenyl)-3H-naphtho[2,1-b]pyran;

3-phenyl-3(2,4-dimethoxyphenyl)-3H-naphtho[2,1-b]pyran; and

3(2,6-difluorophenyl)-3(4-methoxyphenyl)-3H-naphtho[2,1-b]pyran.

Preferred naphthopyranes also include those of the formulae

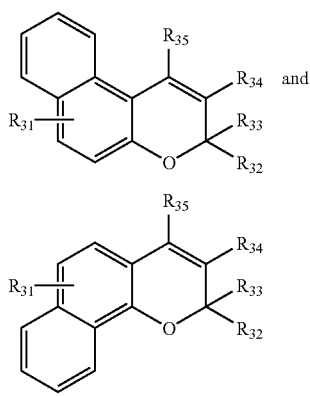

where each of $R_{31}$, $R_{32}$, $R_{33}$, $R_{34}$, $R_{35}$ independently may be hydrogen, a hydrocarbon of 1 to 18 carbon atoms such as phenyl, naphthyl, alkyl, optionally substituted by OH, $C_1$-$C_6$alkoxy; —NR'R"; —NO$_2$; where R' and R" independently are H or $C_1$-$C_{12}$alkyl, $C_4$-$C_{12}$cycloalkyl, $C_7$-$C_{13}$-phenylalkyl, or together are tetramethylene or pentamethylene or O-interrupted tetramethylene.

Benzopyranes, another class of chromenes, include those of the formula

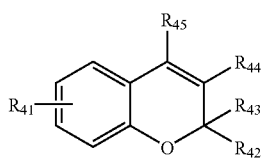

where each of $R_{41}$, $R_{42}$, $R_{43}$, $R_{44}$, $R_{45}$ independently may be hydrogen, a hydrocarbon of 1 to 18 carbon atoms such as phenyl, naphthyl, alkyl, optionally substituted by OH, $C_1$-$C_6$alkoxy; —NR'R"; —NO$_2$; where R' and R" independently are H or $C_1$-$C_{12}$alkyl, $C_4$-$C_{12}$cycloalkyl, $C_7$-$C_{13}$-phenylalkyl, or together are tetramethylene or pentamethylene or O-interrupted tetramethylene.

For example, a chromene may be selected from naphthopyrans of the formula

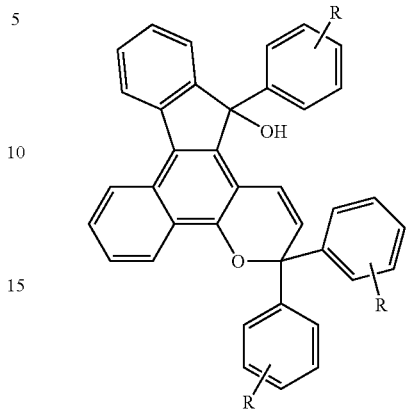

wherein R is H; $C_1$-$C_6$alkyl; $C_1$-$C_6$alkoxy; —NR'R"; —NO$_2$; where R' and R" independently are H or $C_1$-$C_{12}$alkyl, $C_4$-$C_{12}$cycloalkyl, $C_7$-$C_{13}$-phenylalkyl, or together are tetramethylene or pentamethylene or O-interrupted tetramethylene. Chromene1 as used in the examples below is of the above formula where each R is H.

Preference is given to photochromic dyes (b) that do not contain mercury.

Preferred sterically hindered amines (HALS) of component (ii) are those comprising at least one radical of the formula IX, X and/or XI

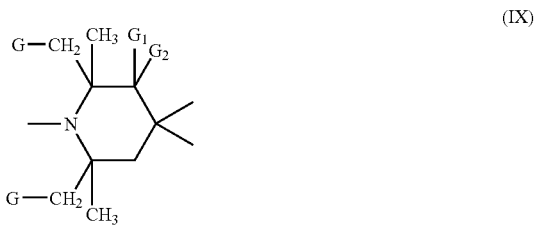

(IX)

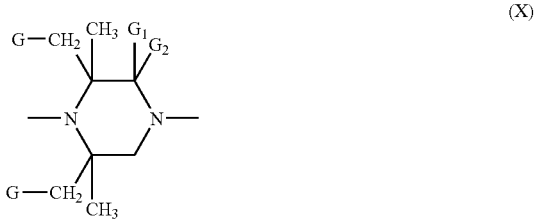

(X)

(XI)

in which
G is hydrogen or methyl, and
$G_1$ and $G_2$ are hydrogen, methyl or together are oxygen.

Of particular interest are systems comprising as component (ii) at least one compound from the group of the sterically hindered amines as described under the following classes (a') to (l') which comprise at least one radical of the formula II or III:

(a') A Compound of the Formula (1a)

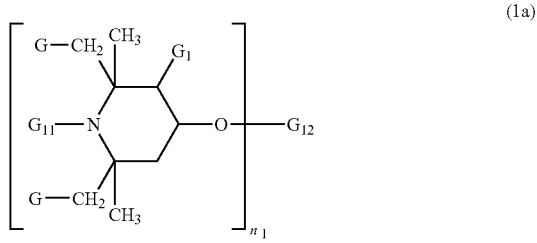

(1a)

in which no is a number from 1 to 4, G and $G_1$, independently of one another, are hydrogen or methyl, $G_{11}$ is hydrogen, O, hydroxyl, NO, —$CH_2CN$, $C_1$-$C_{11}$alkyl, $C_3$-$C_8$alkenyl, $C_3$-$C_8$alkynyl, $C_7$-$C_{12}$aralkyl, $C_1$-$C_{18}$alkoxy, $C_5$-$C_{12}$cycloalkoxy, $C_7$-$C_{15}$-phenylalkoxy, $C_1$-$C_8$alkanoyl, $C_3$-$C_5$alkenoyl, $C_1$-$C_{18}$alkanoyloxy, benzyloxy, glycidyl or a group —$CH_2CH(OH)$-Z, where Z is hydrogen, methyl or phenyl; or $G_{11}$ is $C_1$-$C_{18}$alkoxy, $C_5$-$C_{12}$cycloalkoxy or $C_7$-$C_{15}$-phenylalkoxy each of which is substituted in the aliphatic part by 1-3 OH groups; $G_{11}$ preferably being $C_1$-$C_{12}$alkoxy or cyclohexyloxy or $C_2$-$C_8$hydroxyalkoxy or hydrogen or $C_1$-$C_4$alkyl or allyl or benzyl or acetyl or acryloyl; especially H, methyl, octyloxy, cyclohexyloxy or 2-hydroxy-2-methylpropoxy, of interest is also $G_{11}$ being $C_1$-$C_{18}$alkoxy, $C_5$-$C_{12}$cycloalkoxy, $C_7$-$C_{15}$phenylalkoxy, benzyloxy or $G_{11}$ being $C_1$-$C_{18}$alkoxy, $C_5$-$C_{12}$cycloalkoxy or $C_7$-$C_1$phenylalkoxy each of which is substituted in the aliphatic part by 1-3 OH groups;

and $G_{12}$, if $n_1$ is 1, is hydrogen, $C_1$-$C_{18}$alkyl which is uninterrupted or interrupted by one or more oxygen atoms, COO and/or CONH groups, or is cyanoethyl, benzoyl, glycidyl, a monovalent radical of an aliphatic, cycloaliphatic, araliphatic, unsaturated or aromatic carboxylic acid, carbamic acid or phosphorus-containing acid or a monovalent silyl radical, preferably a radical of an aliphatic carboxylic acid having 2 to 18 carbon atoms, of a cycloaliphatic carboxylic acid having 7 to 15 carbon atoms, or an α,β-unsaturated carboxylic acid having 3 to 5 carbon atoms or of an aromatic carboxylic acid having 7 to 15 carbon atoms, where each carboxylic acid can be substituted in the aliphatic, cycloaliphatic or aromatic moiety by 1 to 3 —$COOZ_{12}$ groups, in which $Z_{12}$ is H, $C_1$-$C_{20}$alkyl, $C_3$-$C_{12}$alkenyl, $C_5$-$C_7$cycloalkyl, phenyl or benzyl, $G_{12}$, if $n_1$ is 2, is $C_2$-$C_{12}$alkylene, $C_4$-$C_{12}$alkenylene, xylylene, a divalent radical of an aliphatic, cycloaliphatic, araliphatic or aromatic dicarboxylic acid, dicarbamic acid or phosphorus-containing acid or a divalent silyl radical, preferably a radical of an aliphatic dicarboxylic acid having 2 to 36 carbon atoms, or a cycloaliphatic or aromatic dicarboxylic acid having 8-14 carbon atoms or of an aliphatic, cycloaliphatic or aromatic dicarbamic acid having 8-14 carbon atoms, where each dicarboxylic acid may be substituted in the aliphatic, cycloaliphatic or aromatic moiety by one or two —$COOZ_{12}$ groups, $G_{12}$, if $n_1$ is 3, is a trivalent radical of an aliphatic, cycloaliphatic or aromatic tricarboxylic acid, which may be substituted in the aliphatic, cycloaliphatic or aromatic moiety by —$COOZ_{12}$, of an aromatic tricarbamic acid or of a phosphorus-containing acid, or is a trivalent silyl radical, preferred radicals including triacyl radicals of nitrilo triacetic acid of benzene tricarboxylic acid, and $G_{12}$, if $n_1$ is 4, is a tetravalent radical of an aliphatic, cycloaliphatic or aromatic tetracarboxylic acid.

The carboxylic acid radicals mentioned above are in each case taken to mean radicals of the formula (—$CO)_xR$, where x is as defined above for $n_1$, and the meaning of R arises from the definition given above.

Alkyl with up to 20 carbon atoms is, for example, methyl, ethyl, n-propyl, n-butyl, sec-butyl, tert-butyl, n-hexyl, n-octyl, 2-ethylhexyl, n-nonyl, n-decyl, n-undecyl, n-dodecyl, n-tridecyl, n-tetradecyl, n-hexadecyl or n-octadecyl.

$C_1$-$C_{18}$alkoxy $G_{11}$ is, for example, methoxy, ethoxy, propoxy, isopropoxy, butoxy, isobutoxy, pentoxy, isopentoxy, hexoxy, heptoxy, octoxy, decyloxy, dodecyloxy, tetradecyloxy, hexadecyloxy and octadecyloxy. $C_6$-$C_{12}$alkoxy, in particular heptoxy and octoxy, is preferred.

$C_5$-$C_{12}$cycloalkoxy $G_{11}$ is, for example, cyclopentoxy, cyclohexoxy, cycloheptoxy, cyclooctoxy, cyclodecyloxy and cyclododecyloxy. $C_5$-$C_8$cycloalkoxy, in particular cyclopentoxy and cyclohexoxy, is preferred.

$C_7$-$C_9$phenylalkoxy is, for example, benzyloxy.

$G_{11}$ as $C_1$-$C_{18}$alkoxy, $C_5$-$C_{12}$cycloalkoxy or $C_7$-$C_{15}$-phenylalkoxy substituted in the aliphatic part by 1-3 OH groups is a radical formed by abstraction of an carbon-bonded hydrogen atom preferably from 2-methyl-2-propanol (tert.-butanol), 2-propanol, 2,2-dimethyl-1-propanol, 2-methyl-2-butanol, ethanol, 1-propanol, 1-butanol, 1-pentanol, 1-hexanol, 1-nonanol, 1-decanol, 1-dodecanol, 1-octadecanol, 2-butanol, 2-pentanol, 2-ethyl-1-hexanol, cyclohexanol, cyclooctanol, allyl alcohol, phenethyl alcohol or 1-phenyl-1-ethanol; 1,2-ethanediol, 1,2-propanedial, 1,3-propanediol, 1,2-butanediol, 1,3-butanediol, 1,4-butanediol, 2,2-dimethyl-1,3-propanediol, 1,2-cyclohexanediol, 1,3-cyclohexanediol or 1,4-cyclohexanediol; glycerol, 1,1,1-tris(hydroxymethyl) methane, 2-ethyl-2-(hydroxymethyl-1,3-propanediol, 1,2,4-butanetriol or 1,2,6-hexanetriol. Most preferred hydroxy substituted $G_{11}$ is 2-hydroxy-2-methylpropoxy.

Examples of several $G_{12}$ radicals are given below.

If $G_{12}$ is a monovalent radical of a carboxylic acid, it is, for example, an acetyl, caproyl, stearoyl, acryloyl, methacryloyl, benzoyl or β-(3,5-di-tert-butyl-4-hydroxyphenyl)propionyl radical.

If $G_{12}$ is a monovalent silyl radical, it is, for example, a radical of the formula —$(C_jH_{2j})$—$Si(Z')_2Z''$, in which j is an integer in the range from 2 to 5, and Z' and Z'', independently of one another, are $C_1$-$C_4$alkyl or $C_1$-$C_4$alkoxy.

If $G_{12}$ is a divalent radical of a dicarboxylic acid, it is, for example, a malonyl, succinyl, glutaryl, adipoyl, suberoyl, sebacoyl, maleoyl, itaconyl, phthaloyl, dibutylmalonyl, dibenzylmalonyl, butyl(3,5-di-tert-butyl-4-hydroxybenzyl) malonyl or bicycloheptenedicarbonyl radical or a group of the formula

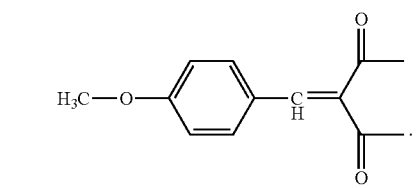

If $G_{12}$ is a trivalent radical of a tricarboxylic acid, it is, for example, a trimellitoyl, citryl or nitrilotriacetyl radical.

If $G_{12}$ is a tetravalent radical of a tetracarboxylic acid, it is, for example, the tetravalent radical of butane-1,2,3,4-tetracarboxylic acid or of pyromellitic acid.

If $G_{12}$ is a divalent radical of a dicarbamic acid, it is, for example, hexamethylenedicarbamoyl or 2,4-toluoylenedicarbamoyl radical.

Preference is given to compounds of the formula (1a) in which G and $G_1$ are hydrogen, $G_{11}$ is hydrogen or methyl, $n_1$ is 2 and $G_{12}$ is the diacyl radical of an aliphatic dicarboxylic acid having 4-12 carbon atoms.

(b') A Compound of the Formula (1b)

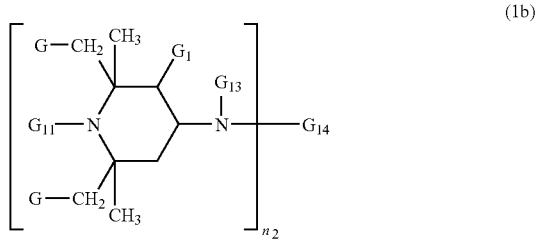

in which $n_2$ is the number 1, 2 or 3, and G, $G_1$ and $G_{11}$ are as defined under (a'), $G_{13}$ is hydrogen, $C_1$-$C_{12}$alkyl, $C_2$-$C_5$hydroxyalkyl, $C_5$-$C_7$cycloalkyl, $C_7$-$C_8$aralkyl, $C_1$-$C_{18}$alkanoyl, $C_3$-$C_5$alkenoyl, benzoyl or a group of the formula

and $G_{14}$, if $n_2$ is 1, is hydrogen, $C_1$-$C_{18}$alkyl, $C_3$-$C_8$alkenyl, $C_5$-$C_7$cycloalkyl, $C_1$-$C_4$alkyl which is substituted by a hydroxyl, cyano, alkoxycarbonyl or carbamide group or group of the formula —CONH—Z, or $G_{14}$ is glycidyl, a group of the formula —CH$_2$—CH(OH)—Z or of the formula —CONH—Z, in which Z is hydrogen, methyl or phenyl or CH$_2$—OZ$_{14}$ with $Z_{14}$ being hydrogen or $C_1$-$C_{18}$alkyl;

$G_{14}$, if $n_2$ is 2, is $C_2$-$C_{12}$alkylene, $C_6$-$C_{12}$arylene, xylylene, a —CH$_2$—CH(OH)—CH$_2$ group or a —CH$_2$—CH(OH)—CH$_2$—O-D-O-group, in which D is $C_2$-$C_{10}$alkylene, $C_6$-$C_{16}$arylene, $C_6$-$C_{12}$cycloalkylene, or, provided that $G_{13}$ is not alkanoyl, alkenoyl or benzoyl, $G_{14}$ can alternatively be 1-oxo-$C_2$-$C_{12}$alkylene, a divalent radical of an aliphatic, cycloaliphatic or aromatic dicarboxylic acid or dicarbamic acid or alternatively the group —CO—, $G_{14}$, if $n_2$ is 3, is a group

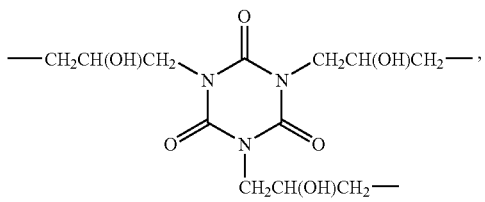

or, if $n_2$ is 1, $G_{13}$ and $G_{14}$ together can be the divalent radical of an aliphatic, cycloaliphatic or aromatic 1,2- or 1,3-dicarboxylic acid.

Some examples for the radicals $G_{13}$, $G_{14}$ and D are given below.

Any alkyl substituents are as defined above for (a').

Any $C_5$-$C_7$cycloalkyl substituents are, in particular, cyclohexyl.

$C_7$-$C_8$aralkyl $G_{13}$ is, in particular, phenylethyl or especially benzyl.

$C_2$-$C_5$hydroxyalkyl $G_{13}$ is, in particular, 2-hydroxyethyl or 2-hydroxypropyl.

$C_1$-$C_{18}$alkanoyl $G_{13}$ is, for example, formyl, acetyl, propionyl, butyryl, octanoyl, dodecanoyl, hexadecanoyl, octadecanoyl, but preferably acetyl, and $C_3$-$C_5$alkenoyl $G_{13}$ is, in particular, acryloyl.

$C_2$-$C_8$alkenyl $G_{14}$ is, for example, allyl, methallyl, 2-butenyl, 2-pentenyl, 2-hexenyl or 2-octenyl.

$G_{14}$ as a hydroxyl-, cyano-, alkoxycarbonyl- or carbamide-substituted $C_1$-$C_4$alkyl can be, for example, 2-hydroxyethyl, 2-hydroxypropyl, 2-cyanoethyl, methoxycarbonylmethyl, 2-ethoxycarbonylethyl, 2-aminocarbonylpropyl or 2-(dimethylaminocarbonyl)ethyl.

Any $C_2$-$C_{12}$alkylene radicals are, for example, ethylene, propylene, 2,2-dimethylpropylene, tetramethylene, hexamethylene, octamethylene, decamethylene or dodecamethylene.

Any $C_6$-$C_{15}$arylene substituents are, for example, o-, m- or p-phenylene, 1,4-naphthylene or 4,4'-diphenylene.

$C_6$-$C_{12}$cycloalkylene is, in particular, cyclohexylene.

$G_{14}$ as 1-oxo-$C_2$-$C_{12}$alkylene is preferably a group

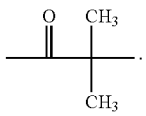

(c') A Compound of the Formula (1c)

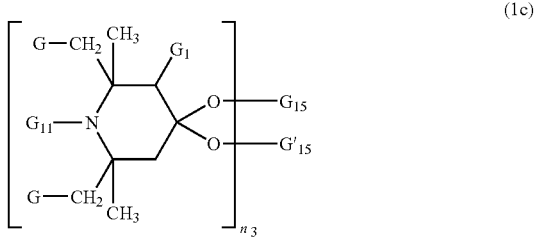

in which $n_3$ is the number 1 or 2, G, $G_1$ and $G_{11}$ are as defined under (a'), and $G_{15}$ and $G'_{15}$ if $n_3$ is 1, are independently $C_1$-$C_{12}$ alkyl, $C_2$-$C_{12}$ alkenyl, $C_7$-$C_{12}$ aralkyl, or $G_{15}$ is also hydrogen, or $G_{15}$ and $G'_{15}$ together are $C_2$-$C_8$alkylene, $C_5$-$C_{15}$alkenylene, $C_2$-$C_8$hydroxyalkylene or $C_4$-$C_{22}$acyloxyalkylene, and if $n_3$ is 2, $G_{15}$ and $G'_{15}$ together are the (—CH$_2$)$_2$C(CH$_2$—)$_2$ group.

$C_2$-$C_8$alkylene or $C_2$-$C_8$hydroxyalkylene $G_{15}$ and $G'_{15}$ is, for example, ethylene, 1-methylethylene, propylene, 2-ethylpropylene or 2-ethyl-2-hydroxymethylpropylene.

$C_4$-$C_{22}$acyloxyalkylene $G_{15}$ and $G'_{15}$ is, for example, 2-thyl-2-acetoxymethylpropylene.

(d') A Compound of the Formula (1d-1), (1d-2) or (1d-3),

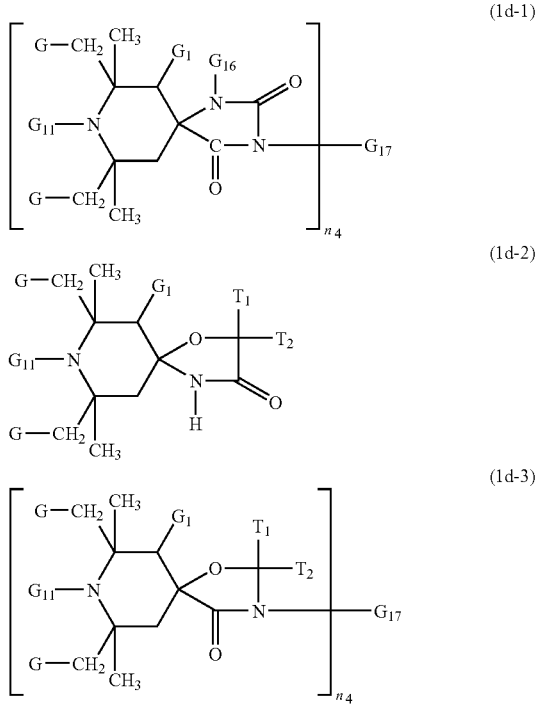

in which $n_4$ is the number 1 or 2, G, $G_1$ and $G_{11}$ are as defined under (a'), $G_{16}$ is hydrogen, $C_1$-$C_{12}$alkyl, allyl, benzyl, glycidyl or $C_2$-$C_6$alkoxyalkyl, and $G_{17}$, if $n_4$ is 1, is hydrogen, $C_1$-$C_{12}$alkyl, $C_3$-$C_5$alkenyl, $C_7$-$C_9$aralkyl, $C_5$-$C_7$cycloalkyl, $C_2$-$C_4$hydroxyalkyl, $C_2$-$C_6$alkoxyalkyl, $C_6$-$C_{10}$aryl, glycidyl or a group of the formula —$(CH_2)_p$—COO-Q or —$(CH_2)_n$—O—CO-Q, in which p is 1 or 2, and Q is $C_1$-$C_4$alkyl or phenyl, and $G_{17}$, if $n_4$ is 2, is $C_2$-$C_{12}$alkylene, $C_4$-$C_{12}$alkenylene, $C_6$-$C_{12}$arylene, a group of the formula —$CH_2$—CH(OH)—$CH_2$—O-D'-O—$CH_2$—CH(OH)—$CH_2$—, in which D' is $C_2$-$C_{10}$alkylene, $C_6$-$C_{15}$arylene or $C_6$-$C_{12}$cycloalkylene, or a group of the formula —$CH_2CH(OD'')CH_2$—$(OCH_2$—CH(OD'')$CH_2)_2$—, in which D'' is hydrogen, $C_1$-$C_{18}$alkyl, allyl, benzyl, $C_2$-$C_{12}$alkanoyl or benzoyl, $T_1$ and $T_2$, independently of one another, are hydrogen, $C_1$-$C_{18}$alkyl or unsubstituted or halogen- or $C_1$-$C_4$alkyl-substituted $C_6$-$C_{10}$aryl or $C_7$-$C_9$aralkyl, or $T_1$ and $T_2$ together with the carbon atom bonding them form a $C_5$-$C_{14}$cycloalkane ring.

Any $C_1$-$C_{12}$alkyl substituents are, for example, methyl, ethyl, n-propyl, n-butyl, sec-butyl, tertbutyl, n-hexyl, n-octyl, 2-ethylhexyl, n-nonyl, n-decyl, n-undecyl or n-dodecyl.

Any $C_1$-$C_{18}$alkyl substituents can be, for example, the abovementioned groups and in addition, for example, n-tridecyl, n-tetradecyl, n-hexadecyl or n-octadecyl.

Any $C_2$-$C_6$alkoxyalkyl substituents are, for example, methoxymethyl, ethoxymethyl, propoxymethyl, tert-butoxymethyl, ethoxyethyl, ethoxypropyl, n-butoxyethyl, tert-butoxyethyl, isopropoxyethyl or propoxypropyl.

$C_3$-$C_5$alkenyl $G_{17}$ is, for example, 1-propenyl, allyl, methallyl, 2-butenyl or 2-pentenyl.

$C_7$-$C_9$aralkyl $G_{17}$, $T_1$ and $T_2$ are, in particular, phenethyl or especially benzyl. If $T_1$ and $T_2$ together with the carbon atom form a cycloalkane ring, this can be, for example, a cyclopentane, cyclohexane, cyclooctane or cyclododecane ring.

$C_2$-$C_4$hydroxyalkyl $G_{17}$ is, for example, 2-hydroxyethyl, 2-hydroxypropyl, 2-hydroxybutyl or 4-hydroxybutyl.

$C_6$-$C_{10}$aryl $G_{17}$, $T_1$ and $T_2$ are, in particular, phenyl or α- or β-naphthyl, which are unsubstituted or substituted by halogen or $C_1$-$C_4$alkyl.

$C_2$-$C_{12}$alkylene $G_{17}$ is, for example, ethylene, propylene, 2,2-dimethylpropylene, tetramethylene, hexamethylene, octamethylene, decamethylene or dodecamethylene.

$C_4$-$C_{12}$alkenylene $G_{17}$ is, in particular, 2-butenylene, 2-pentenylene or 3-hexenylene.

$C_6$-$C_{12}$arylene $G_{17}$ is, for example, o-, m- or p-phenylene, 1,4-naphthylene or 4,4'-diphenylene.

$C_2$-$C_{12}$alkanoyl D'' is, for example, propionyl, butyryl, octanoyl, dodecanoyl, but preferably acetyl.

$C_2$-$C_{10}$alkylene, $C_6$-$C_{15}$arylene or $C_6$-$C_{12}$cycloalkylene D' have, for example, one of the definitions given for D under (b').

(e') A Compound of the Formula (1e)

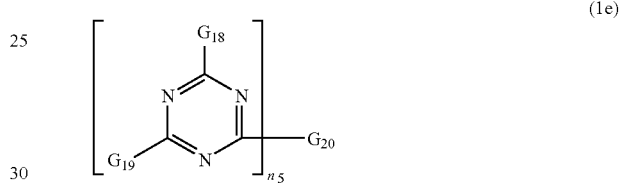

in which $n_5$ is the number 1 or 2, and $G_{18}$ is a group of the formula

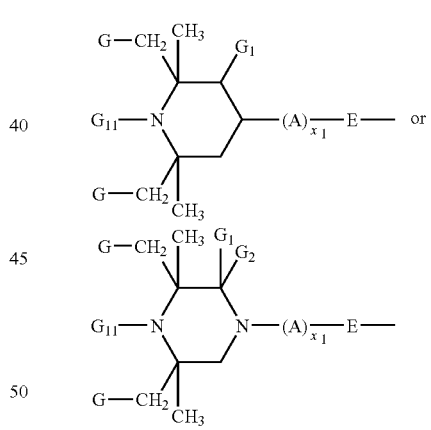

in which G and $G_{11}$ are as defined under (a'), and $G_1$ and $G_2$ are hydrogen, methyl or, together, are a substituent=O, E is —O— or —ND'''-, A is $C_2$-$C_6$alkylene or —$(CH_2)_3$—O— and $x_1$ is the number 0 or 1, D''' is hydrogen, $C_1$-$C_{12}$alkyl, $C_2$-$C_{12}$alkylene-N($D^V$)$_2$, $C_2$-$C_5$hydroxyalkyl or $C_5$-$C_7$cycloalkyl, where $D^V$, independently, is hydrogen or butyl, $G_{19}$ is identical to $G_{18}$ or is one of the groups —N($G_{21}$)($G_{22}$), —$OG_{23}$, —N(H)($CH_2OG_{23}$) or —N($CH_2OG_{23}$)$_2$, $G_{20}$, if $n_5$=1, is identical to $G_{18}$ or $G_{19}$ and, if $n_5$=2, is an -E-$D^{IV}$-E-group, in which $D^{IV}$ is $C_2$-$C_8$alkylene or $C_2$-$C_8$alkylene which is interrupted by 1 or 2-$NG_{21}$-groups, $G_{21}$ is hydrogen, $C_1$-$C_{12}$alkyl, cyclohexyl, benzyl or $C_1$-$C_4$-hydroxyalkyl or a group of the formula

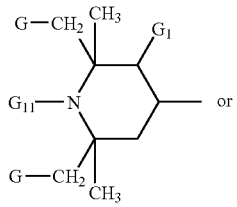

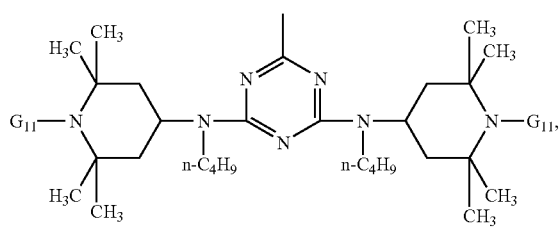

$G_{22}$ is $C_1$-$C_{12}$alkyl, cyclohexyl, benzyl or $C_1$-$C_4$hydroxyalkyl, and $G_{23}$ is hydrogen, $C_1$-$C_{12}$alkyl or phenyl, or $G_2$, and $G_{22}$ together are $C_4$-$C_5$alkylene or $C_4$-$C_5$oxaalkylene, for example —$CH_2CH_2$—O—$CH_2CH_2$—, or a group of the formula —$CH_2CH_2$—N($G_{11}$)—$CH_2CH_2$—.

Some examples of the several variables in the formula (Ie) are given below.

Any $C_1$-$C_{12}$alkyl substituents are, for example, methyl, ethyl, n-propyl, n-butyl, sec-butyl, tert-butyl, n-hexyl, n-octyl, 2-ethylhexyl, n-nonyl, n-decyl, n-undecyl or n-dodecyl.

Any hydroxyalkyl substituents are, for example, 2-hydroxyethyl, 2-hydroxypropyl, 3-hydroxypropyl, 2-hydroxybutyl or 4-hydroxybutyl.

Any $C_5$-$C_7$cycloalkyl substituents are, for example, cyclopentyl, cyclohexyl or cycloheptyl. Cyclohexyl is preferred.
$C_2$-$C_6$alkylene A is, for example, ethylene, propylene, 2,2-dimethylpropylene, tetramethylene or hexamethylene.
If $G_{21}$ and $G_{22}$ together are $C_4$-$C_5$alkylene or oxaalkylene, they are, for example, tetramethylene, pentamethylene or 3-oxapentamethylene.

(f') A Compound of the Formula (1f)

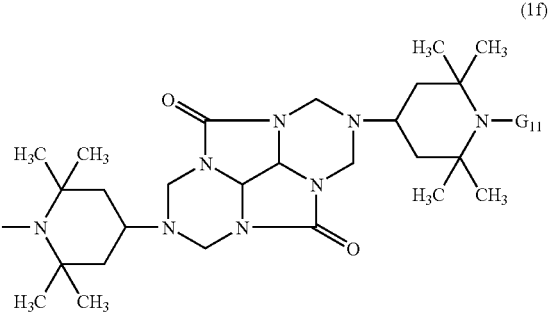

(1f)

wherein $G_{11}$ is as defined under (a').

(g') Oligomeric or polymeric compounds whose recurring structural unit contains a 2,2,6,6-tetraalkylpiperidinyl radical, in particular polyesters, polyethers, polyamides, polyamines, polyurethanes, polyureas, polyaminotriazines, poly(meth)acrylates, poly(meth)acrylamides and copolymers thereof which contain such radicals.

Examples of 2,2,6,6-polyalkylpiperidine compounds from this class are the compounds of the following formulae. $m_1$ to $m_{14}$ is a number from 2 to about 200, preferably 2 to 100, for example 2 to 50, 2 to 40, 3 to 40 or 4 to 10.

The meanings of the end groups which saturate the free valences in the oligomeric or polymeric compounds listed below depend on the processes used for the preparation of said compounds. The end groups can also in addition be modified after the synthesis of the compounds.

Examples for polymeric compounds are;
1) A Compound of the Formula (1g)

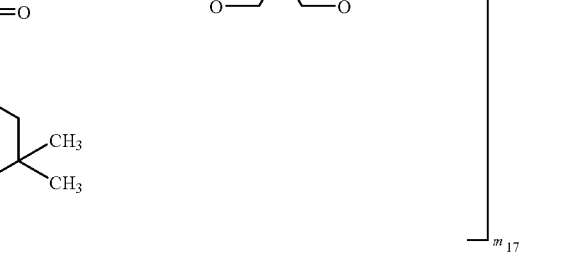

(1g)

wherein $G_{24}$, $G_{25}$, $G_{26}$, $G_{27}$ and $G_{28}$, independently of one another, are a direct bond or $C_1$-$C_{10}$alkylene, $G_{11}$ is as defined under (a') and $m_{17}$ is a number from 1 to 50.

In the compound of the formula (1g), the end group bonded to the >C=O group can be, for example,

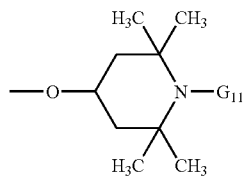

and the end group bonded to the oxygen can be, for example

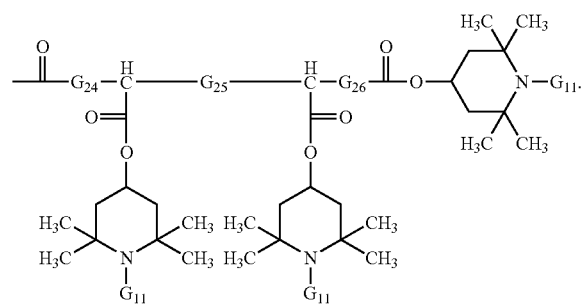

2) Compound of the Formula (2g)

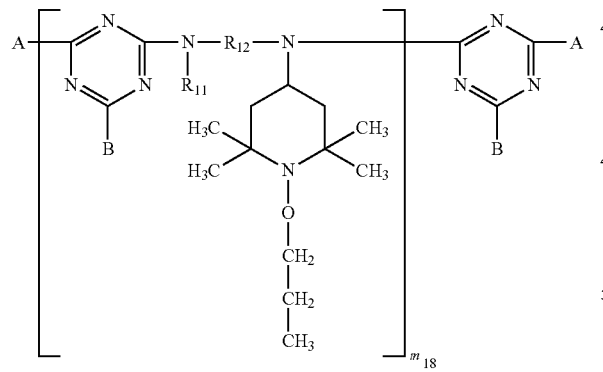

in which the index $m_1$ ranges from 1 to 15;

$R_{12}$ is $C_2$-$C_{12}$alkylene, $C_4$-$C_{12}$alkenylene, $C_5$-$C_7$cycloalkylene, $C_5$-$C_7$cycloalkylene-di($C_1$-$C_4$alkylene), $C_1$-$C_4$alkylenedi($C_5$-$C_7$cycloalkylene), phenylenedi($C_1$-$C_4$alkylene) or $C_4$-$C_{12}$alkylene interrupted by 1,4-piperazinediyl, —O— or >N—$X_1$ with $X_1$ being $C_1$-$C_{12}$acyl or ($C_1$-$C_{12}$alkoxy)carbonyl or having one of the definitions of $R_{14}$ given below except hydrogen;

or $R_{12}$ is a group of the formula (2g') or (2g");

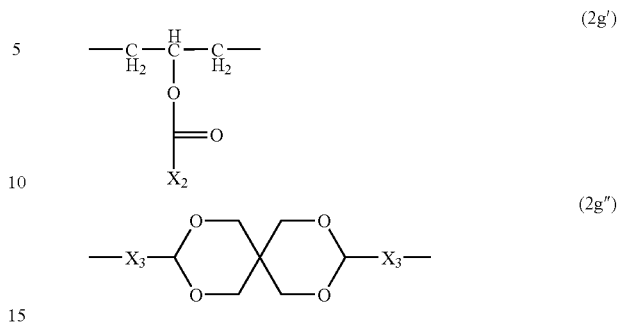

$X_2$ being $C_1$-$C_{18}$alkyl, $C_5$-$C_{12}$cycloalkyl which is unsubstituted or substituted by 1, 2 or 3

$C_1$-$C_4$alkyl; phenyl which is unsubstituted or substituted by 1, 2 or 3 $C_1$-$C_4$alkyl or $C_1$-$C_4$alkoxy; $C_7$-$C_9$phenylalkyl which is unsubstituted or substituted on the phenyl by 1, 2 or 3

$C_1$-$C_4$alkyl; and the radicals $X_3$ being independently of one another $C_2$-$C_{12}$alkylene;

the radicals A are independently of one another —$OR_{13}$, —$N(R_{14})(R_{15})$ or a group of the formula (2g''');

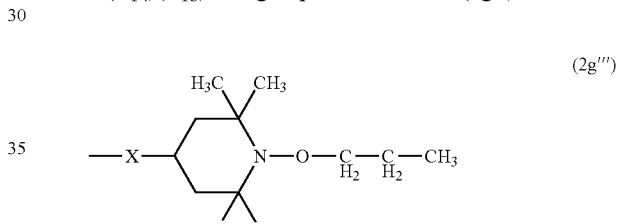

$R_{13}$, $R_{14}$ and $R_{15}$, which are identical or different, are hydrogen, $C_1$-$C_{18}$alkyl, $C_5$-$C_{12}$cycloalkyl which is unsubstituted or substituted by 1, 2 or 3 $C_1$-$C_4$alkyl; $C_3$-$C_{18}$alkenyl, phenyl which is unsubstituted or substituted by 1, 2 or 3 $C_1$-$C_4$alkyl or $C_1$-$C_4$alkoxy; $C_7$-$C_9$-phenylalkyl which is unsubstituted or substituted on the phenyl by 1, 2 or 3 $C_1$-$C_4$alkyl; tetrahydrofurfuryl or $C_2$-$C_4$alkyl which is substituted in the 2, 3 or 4 position by —OH, $C_1$-$C_8$alkoxy, di($C_1$-$C_4$alkyl)amino or a group of the formula ($2g^{IV}$);

with Y being —O—, —$CH_2$—, —$CH_2CH_2$— or >N—$CH_3$, or —$N(R_{14})(R_{15})$ is additionally a group of the formula ($2g^{IV}$);

X is —O— or >N—$R_{16}$;

$R_{16}$ is hydrogen, $C_1$-$C_{18}$alkyl, $C_3$-$C_{18}$alkenyl, $C_5$-$C_{12}$cycloalkyl which is unsubstituted or substituted by 1, 2 or 3 $C_1$-$C_4$alkyl; $C_7$-$C_9$-phenylalkyl which is unsubstituted or substituted on the phenyl by 1, 2 or 3 $C_1$-$C_4$alkyl; tetrahydrofurfuryl, a group of the formula ($2g^V$),

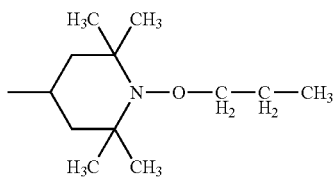
(2g$^V$)

or $C_2$-$C_4$alkyl which is substituted in the 2, 3 or 4 position by —OH, $C_1$-$C_8$alkoxy, di($C_1$-$C_4$alkyl)amino or a group of the formula (2g$^{IV}$);

$R_{11}$ has one of the definitions given for $R_{16}$; and the radicals B have independently of one another one of the definitions given for A.

3) A Compound of the Formula (3g)

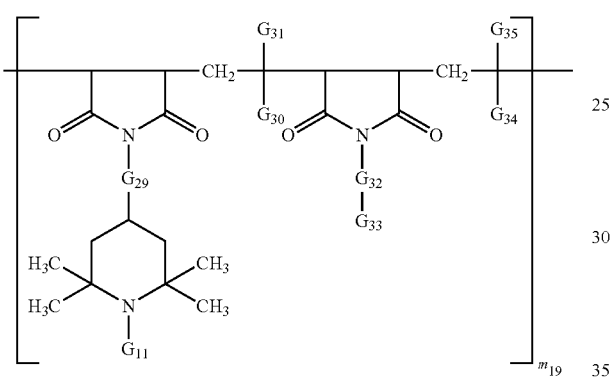
(3g)

in which $G_{11}$ is as defined under (a'), $G_{29}$ and $G_{32}$, independently of one another, are a direct bond or a —N($X_1$)—CO—$X_2$—CO—N($X_3$)— group, where $X_1$ and $X_3$, independently of one another, are hydrogen, $C_1$-$C_8$alkyl, $C_5$-$C_{12}$cycloalkyl, phenyl, $C_7$-$C_9$phenylalkyl or a group of the formula

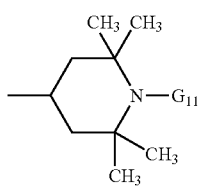
(3g)

and $X_2$ is a direct bond or $C_1$-$C_4$alkylene, $G_{30}$, $G_{31}$, $G_{34}$ and $G_{35}$, independently of one another, are hydrogen, $C_1$-$C_{30}$alkyl, $C_5$-$C_{12}$cycloalkyl or phenyl, $G_{33}$ is hydrogen, $C_1$-$C_{30}$alkyl, $C_5$-$C_{12}$cycloalkyl, $C_7$-$C_9$-phenylalkyl, phenyl or a group of the formula (3g), and $m_{19}$ is a number from 1 to 50.

In the compounds of the formula (3g), the end group bonded to the 2,5-dioxopyrrolidine ring can be, for example, hydrogen, and the end group bonded to the —C($G_{34}$)($G_{35}$)-radical can be, for example,

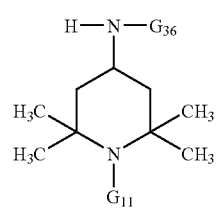

4) A Product Obtainable by Reacting an Intermediate Product, Obtained by Reaction of a Polyamine of the Formula (4g) with Cyanuric Chloride, with a Compound of the Formula (4g')

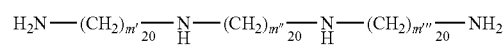
(4g)

$$H_2N-(CH_2)_{m'_{20}}-\underset{H}{N}-(CH_2)_{m''_{20}}-\underset{H}{N}-(CH_2)_{m'''_{20}}-NH_2$$

(4g')

in which $m'_{20}$, $m''_{20}$ and $m'''_{20}$, independently of one another, are a number from 2 to 12, $G_{36}$ is hydrogen, $C_1$-$C_{12}$alkyl, $C_5$-$C_{12}$cycloalkyl, phenyl or $C_7$-$C_9$phenylalkyl, and $G_{11}$ is as defined under (a').

In general, the above reaction product can be represented for example by a compound of the following 3 formulae. It can also be in the form of a mixture of these three compounds:

35
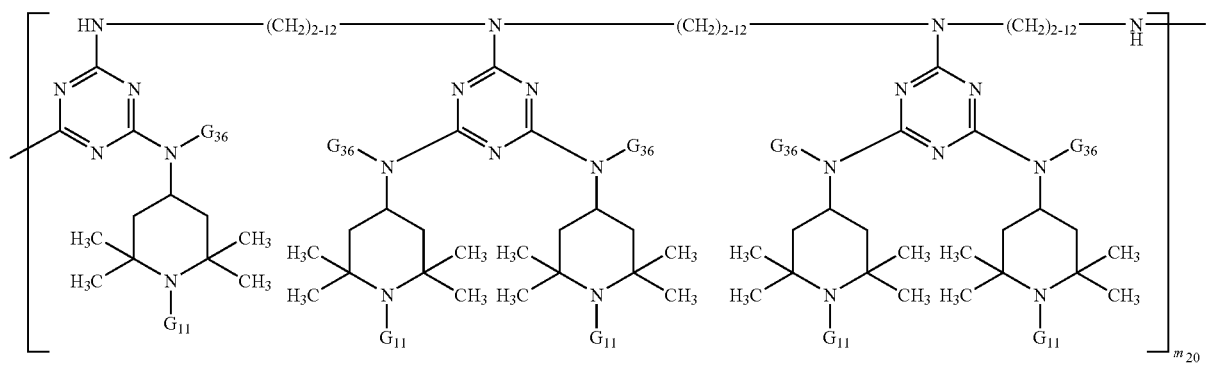
36
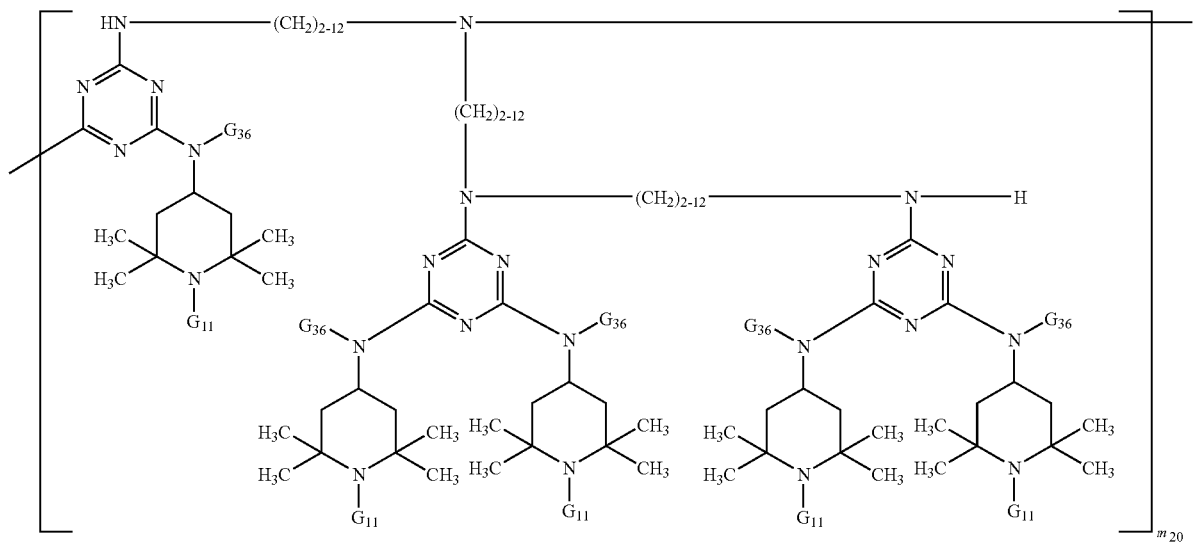
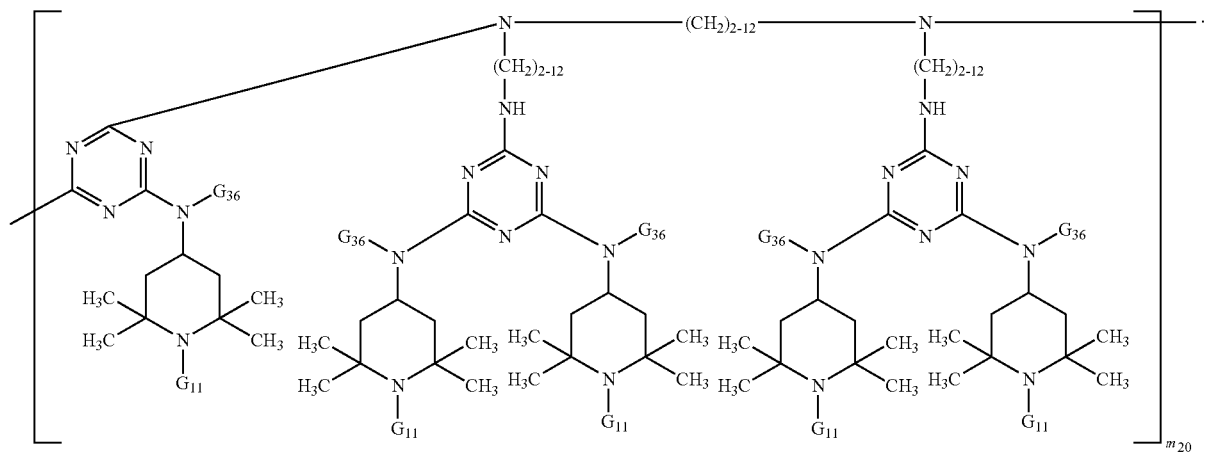

5) A Compound of the Formula (5g)

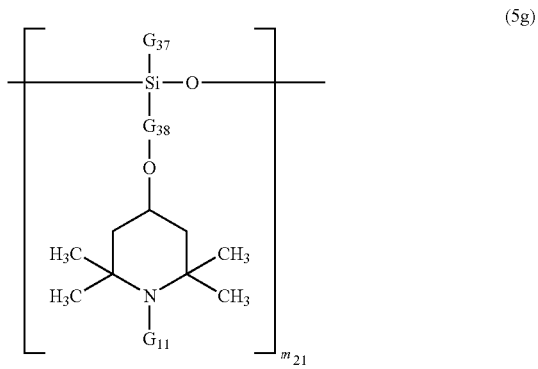

in which $G_{11}$ is as defined under (a'), $G_{37}$ is $C_1$-$C_{10}$alkyl, $C_5$-$C_{12}$cycloalkyl, $C_1$-$C_4$alkyl-substituted $C_5$-$C_{12}$cycloalkyl, phenyl or $C_1$-$C_{10}$alkyl-substituted phenyl, $G_{38}$ is $C_3$-$C_{10}$alkylene and $m_{21}$ is a number from 1 to 50.

In the compounds of the formula (5g), the terminal group bonded to the silicon atom can be, for example, $(G_{37})_3Si$—O—, and the terminal group bonded to the oxygen can be, for example, —$Si(G_{37})_3$.

The compounds of the formula (5g) can also be in the form of cyclic compounds if $m_{21}$ is a number from 3 to 10, i.e. the free valences shown in the structural formula then form a direct bond.

6) A Compound of the Formula (6g)

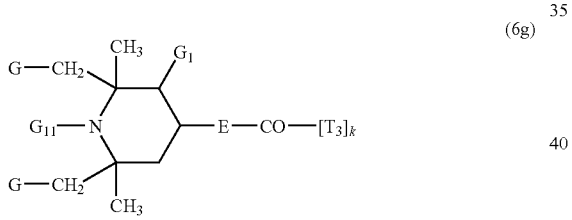

where E is —O— or —ND'''- as defined under (e'), $T_3$ is ethylene or 1,2-propylene, is the repeating structural unit derived from an alpha-olefin copolymer with an alkyl acrylate or methacrylate; preferably a copolymer of ethylene and ethyl acrylate, and where k is 2 to 100.

7) A Compound of the Formula (7g)

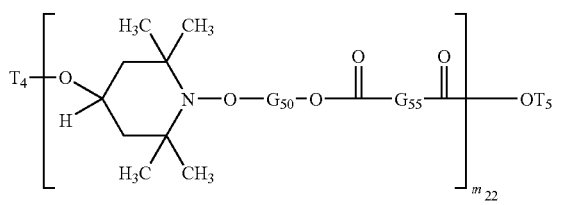

wherein m is 1 to 100;
$G_{50}$ is straight or branched chain alkylene of 1 to 18 carbon atoms, cycloalkylene of 5 to 8 carbon atoms, cycloalkenylene of 5 to 8 carbon atoms, alkenylene of 3 to 18 carbon atoms, a straight or branched chain alkylene of 1 to 4 carbon atoms substituted by phenyl or by phenyl substituted by one or two alkyl of 1 to 4 carbon atoms, with the proviso that in formula (7g) successive hindered amine moieties can be oriented in either a head to head or head to tail fashion;

$T_4$ is hydrogen or
$T_4$ is

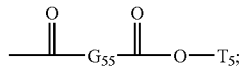

$G_{55}$ is a straight or branched chain alkylene of 1 to 18 carbon atoms, cycloalkylene or cycloalkenylene of 5 to 8 carbon atoms, phenylene or —NH-alkylene-NH— of 2 to 18 carbon atoms including 5-amino-1-aminomethyl-1,3,3-trimethylcyclohexane and —NH-xylylene-NH—;

$T_5$ is alkyl of 1 to 4 carbon atoms;

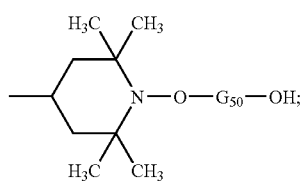

or $T_5$ is

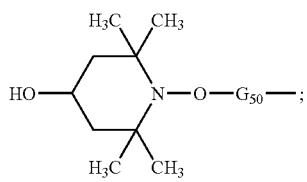

In the above shown oligomeric and polymeric compounds, examples of alkyl are methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, eicosyl and docosyl;

examples of cycloalkyl are cyclopentyl, cyclohexyl, cycloheptyl and cyclooctyl;

an example of $C_7$-$C_9$phenylalkyl is benzyl; and examples of alkylene are ethylene, propylene, trimethylene, tetramethylene, pentamethylene, 2,2-dimethyltrimethylene, hexamethylene, trimethylhexamethylene, octamethylene and decamethylene.

(h') A Compound of the Formula (1h)

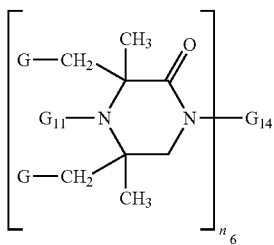

in which $n_6$ is the number 1 or 2, G and $G_{11}$ are as defined under (a'), and $G_{14}$ is as defined under (b'), but $G_{14}$ cannot be —CONH—Z and —CH$_2$—CH(OH)—CH$_2$—O-D-O—.

(i') A Compound of the Formula (1i)

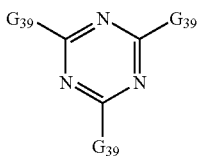

wherein the radicals $G_{39}$, independently of one another, are a group of the formula (1i-1)

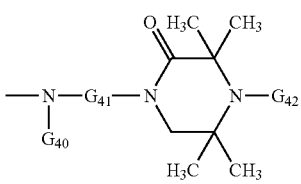

in which $G_{40}$ is $C_1$-$C_{12}$alkyl or $C_5$-$C_{12}$cycloalkyl, $G_{41}$ is $C_2$-$C_{12}$alkylene and $G_{42}$ is as defined for $G_{11}$ above.

Alkyl is for example $C_1$-$C_4$alkyl, in particular methyl, ethyl, propyl or butyl.

Cycloalkyl is preferably cyclohexyl.

Alkylene is for example ethylene, propylene, trimethylene, tetramethylene, pentamethylene, 2,2-dimethyltrimethylene or hexamethylene.

Alkenyl is preferably allyl.

Phenylalkyl is preferably benzyl.

Acyl is preferably acetyl.

(j') A Compound of the Formula (1j)

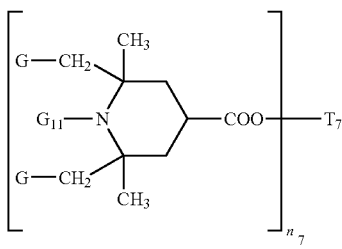

wherein G, $G_{11}$ are as defined above and when $n_7$ is 1, $T_7$ is hydrogen, $C_1$-$C_{12}$alkyl, $C_3$-$C_5$alkenyl, $C_7$-$C_9$aralkyl, $C_5$-$C_7$cycloalkyl, $C_2$-$C_4$hydroxyalkyl, $C_2$-$C_6$alkoxyalkyl, $C_6$-$C_{10}$ aryl, glycidyl, a group of the formula —(CH$_2$)$_t$COO-Q or of the formula —(CH$_2$)$_t$—O—CO-Q wherein t is 1 or 2, and Q is $C_1$-$C_4$alkyl or phenyl; or when $n_7$ is 2, $T_7$ is $C_2$-$C_{12}$alkylene, $C_6$-$C_{12}$arylene, a group —CH$_2$CH(OH)—CH$_2$—O—X—O—CH$_2$—CH(OH)—CH$_2$— wherein X is $C_2$-$C_{10}$alkylene, $C_6$-$C_{16}$arylene or $C_6$-$C_{12}$cycloalkylene, or a group —CH$_2$CH(OZ')CH$_2$—(OCH$_2$—CH(OZ')CH$_2$)$_2$— wherein Z' is hydrogen, $C_1$-$C_{18}$alkyl, allyl, benzyl, $C_2$-$C_{12}$alkanoyl or benzoyl.

(k') A Compound of the Formula (1k)

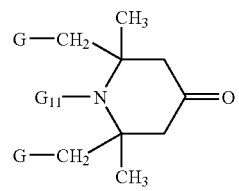

wherein G, $G_{11}$ are as defined above.

(l') A Compound of the Formula (1l)

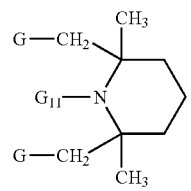

wherein G, $G_{11}$ are as defined above.

Examples for HALS are the compounds bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)-malonate, 3-n-octyl-7,7,9,1-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)-ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)pyrrolidine-2,5-dione, 5-(2-ethylhexanoyl)-oxymethyl-3,3,5-trimethyl-2-morpholinone, 1-(2-hydroxy-2-methylpropoxy)-4-octadecanoyloxy-2,2,6,6-tetramethylpiperidine, 1,3,5-tris(N-cyclohexyl-N-(2,2,6,6-tetramethylpiperazin-3-on-4-yl)amino)-s-triazine, 1,3,5-tris(N-cyclohexyl-N-(1,2,2,6,6-pentamethylpiperazin-3-on-4-yl)amino)-s-triazine, the reaction product of 2,4-bis[(1-cyclohexyloxy-2,2,6,6-piperidin-4-yl)butylamino]-6-chloro-s-triazine with N,N'-bis(3-aminopropyl)ethylenediamine), a mixture of 4-hexadecyloxy- and 4-stearyloxy-2,2,6,6-tetramethylpiperidine, a condensate of N,N'-bis(2,2,6,6-tetramethyl-4-piperidyl)hexamethylenediamine and 4-cyclohexylamino-2,6-dichloro-1,3,5-triazine, a condensate of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); a condensate of 1,6-hexanediamine and 2,4,6-trichloro-1,3,5-triazine as well as N,N-dibutylamine and 4-butylamino-2,2,6,6-tetramethylpiperidine (CAS Reg. No. [192268-64-7]); N-(2,2,6,6-tetramethyl-4-piperidyl)-n-dodecylsuccinimide; N-(1,2,2,6,6-pentamethyl-4-piperidyl)-n-dodecylsuccinimide; 2-undecyl-7,7,9,9-tetramethyl-1-oxa-3,8-diaza-4-oxo-spiro[4,5]decane; 5-(2-ethylhexanoyl)oxymethyl-3,3,5-trimethyl-2-morpholinone; a reaction product of 7,7,9,9-tetramethyl-2-cycloundecyl-1-oxa-3,8-diaza-4-oxospiro-[4,5]decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, a diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, a reaction product of maleic acid anhydride-α-olefin copolymer with 2,2,6,6-tetramethyl-4-aminopiperidine or 1,2,2,6,6-pentamethyl-4-aminopiperidine.

Preferred HALS are of molecular weight 400 g/mol or higher; especially preferred are oligomeric HALS of the classes mentioned above, e.g. of molecular weight of 1000 g/mol or higher, e.g. 1500-15000 g/mol.

Especially preferred are those of the alkoxyamine class (NOR-HALS), e.g. compound Hi as used in the examples below (also disclosed in Example 2 of U.S. Pat. No. 6,117,995).

An appropriate combination of the photochromic dyes with UV absorber and a HALS provides an exceptional improvement of the long-term photostability, achieving a lifetime thirty times longer than the unstabilized system.

The components used in the invention can be pure or mixtures of compounds.

Components (c) to be used within present invention basically are known materials, many are commercially available.

Optional further ingredients include further stabilizers, antioxidants, softeners, flame retardants etc. as commonly used for polymeric material, such as the following components:

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl)adipate.

1.4. Tocopherols, for example α-tocopherol, β-tocopherol, γ-tocopherol, 6-tocopherol and mixtures thereof (vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)-disulfide.

1.6. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methyl benzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tertbutyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tertbutyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis(3,5-di-tert-butyl-4-hydroxyphenyl)propane, 2,2-bis-(5-tert-butyl-4-hydroxy-2-methylphenyl)-4-n-dodecylmercaptobutane, 1,1,5,5-tetra(5-tert-butyl-4-hydroxy-2-methylphenyl)pentane.

1.7. O-, N- and S-benzyl compounds, for example 3, 5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.8. Hydroxybenzylated malonates, for example dioctadecyl-2,2-bis(3,5-di-tert-butyl-2-hydroxybenzyl)malonate, di-octadecyl-2-(3-tert-butyl-4-hydroxy-5-methylbenzyl)

malonate, di-dodecylmercaptoethyl-2,2-bis(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.

1.9. Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris-(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris-(3,5-di-tert-butyl-4-hydroxyphenylethyl)-1,3,5-triazine, 1,3,5-tris(3,5-di-tert-butyl-4-hydroxy-phenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl-3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl) propionic acid with mono- or polyhydric alcohols, e.g. with methanol, ethanol, n-octanol, 1-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane; 3,9-bis[2-{3-(3-tertbutyl-4-hydroxy-5-methylphenyl)propionyloxy}-1,1-dimethylethyl]-2,4,8,10-tetraoxaspiro[5.5]-undecane.

1.15. Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl)propionic acid e.g. N,N'-bis(3,5-di-tertbutyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard® XL-1, supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxy-diphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octylphenothiazines, N-allylphenothiazine, N,N,N',N'-tetraphenyl-1,4-diaminobut-2-ene, N,N-bis-(2,2,6,6-tetramethyl-piperid-4-yl-hexamethylenediamine, bis(2,2,6,6-tetramethylpiperid-4-yl)-sebacate, 2,2,6,6-tetramethylpiperidin-4-one, 2,2,6,6-tetramethylpiperidin-4-ol.

2. UV Absorbers and Light Stabilisers 2.1. 2-(2'-Hydroxyphenyl)benzotriazoles, for example 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5- chlorobenzotriazole, 2-(3'-sec-butyl-5-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis(α,α-dimethylbenzyl)-2'-hydroxyphenyl)benzotriazole, 2-(3'-tert-butyl-2'-hydroxy-5'-(2-octyloxycarbonylethyl) phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl) phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl) phenylbenzotriazole, 2,2'-methylenebis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO—CH$_2$CH$_2$]$_2$, where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)phenyl]-benzotriazole; 2-[2'-hydroxy-3'-(1,1,3,3-tetramethylbutyl)-5'-(α,α-dimethylbenzyl)phenyl]benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, for example 4-tert-butylphenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-β-methoxycinnamate, butyl α-cyano-β-methyl-p-methoxycinnamate, methyl α-carbomethoxy-p-methoxycinnamate and N—(β-carbomethoxy-β-cyanovinyl)-2-methylindoline.

2.5. Nickel compounds, for example nickel complexes of 2,2'-thiobis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenylundecylketoxime, nickel complexes of 1-phenyl-4-lauroyl-5-hydroxypyrazole, with or without additional ligands.

2.6. Oxamides, for example 4, 4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

4. Phosphites and phosphonites, for example triphenyl phosphite, diphenylalkyl phosphites, phenyldialkyl phosphites, tris(nonylphenyl) phosphite, trilauryl phosphite, trioctadecyl phosphite, distearylpentaerythritol diphosphite, tris(2,4-di-tert-butylphenyl) phosphite, diisodecyl pentaerythritol diphosphite, bis(2,4-di-tert-butylphenyl)pentaerythritol diphosphite, bis(2,4-di-cumylphenyl)pentaerythritol diphosphite, bis(2,6-di-tert-butyl-4-methylphenyl)pentaerythritol diphosphite, diisodecyloxypentaerythritol diphosphite, bis (2,4-di-tert-butyl-6-methylphenyl)-pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tertbutyl-6-methylphenyl) methyl phosphite, bis(2,4-di-tert-butyl-6-methylphenyl) ethyl phosphite, 6-fluoro-2,4,8,10-tetra-tert-butyl-12-methyl-dibenz[d,g]-1,3,2-dioxaphosphocin, 2,2',2"-nitrilo-[triethyltris(3,3',5,5'-tetra-tert-butyl-1,1'-biphenyl-2,2'-diyl) phosphite], 2-ethylhexyl(3,3',5,5'-tetra-tert-butyl-, 1'-biphenyl-2,2'-diyl)phosphite, 5-butyl-5-ethyl-2-(2,4,6-tri-tert-butylphenoxy)-1,3,2-dioxaphosphirane.

The following phosphites are especially preferred:
Tris(2,4-di-tert-butylphenyl) phosphite (Irgafos® 168, Ciba-Geigy), tris(nonylphenyl) phosphite,

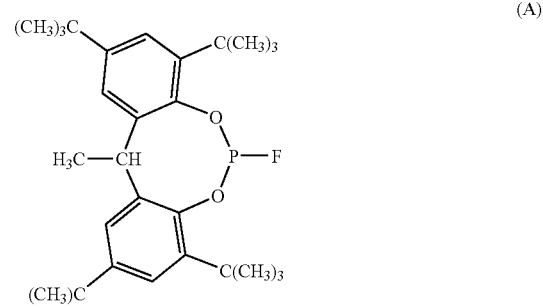

(A)

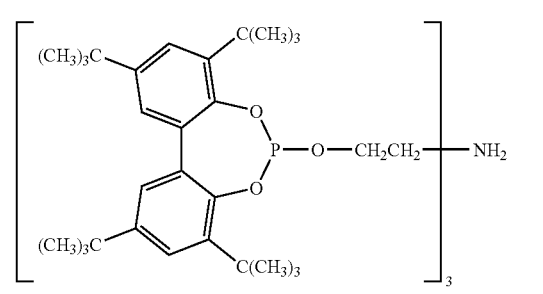

(B)

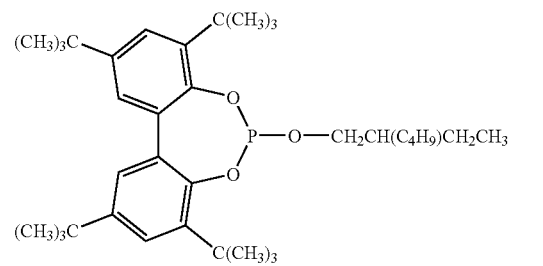

(C)

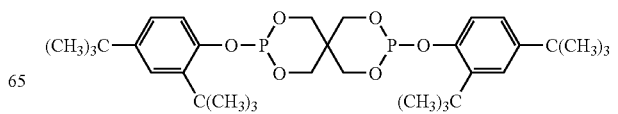

(D)

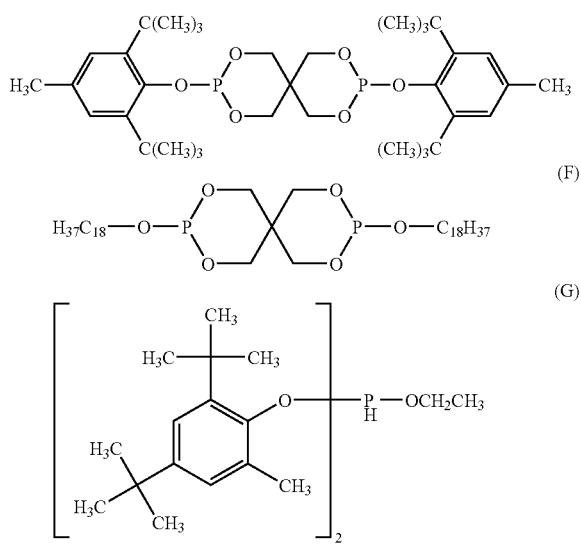

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones, for example N-benzyl-alpha-phenylnitrone, N-ethyl-alpha-methylnitrone, N-octylalpha-heptylnitrone, N-lauryl-alpha-undecylnitrone, N-tetradecyl-alpha-tridecylnitrone, N-hexadecyl-alpha-pentadecylnitrone, N-octadecyl-alpha-heptadecylnitrone, N-hexadecyl-alpha-heptadecylnitrone, N-ocatadecyl-alpha-pentadecylnitrone, N-heptadecyl-alpha-heptadecylnitrone, N-octadecyl-alpha-hexadecylnitrone, nitrone derived from N,N-dialkylhydroxylamine derived from hydrogenated tallow amine.

7. Thiosynergists, for example dilauryl thiodipropionate or distearyl thiodipropionate.

8. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

9. Polyamide stabilisers, for example copper salts in combination with iodides and/or phosphorus compounds and salts of divalent manganese.

10. Basic co-stabilisers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate.

11. Nucleating agents, for example inorganic substances, such as talcum, metal oxides, such as titanium dioxide or magnesium oxide, phosphates, carbonates or sulfates of, preferably, alkaline earth metals; organic compounds, such as mono- or polycarboxylic acids and the salts thereof, e.g. 4-tert-butylbenzoic acid, adipic acid, diphenylacetic acid, sodium succinate or sodium benzoate; polymeric compounds, such as ionic copolymers (ionomers). Especially preferred are 1,3:2,4-bis(3',4'-dimethylbenzylidene)sorbitol, 1,3:2,4-di(paramethyldibenzylidene)sorbitol, and 1,3:2,4-di (benzylidene)sorbitol.

12. Fillers and reinforcing agents, for example calcium carbonate, silicates, glass fibres, glass beads, asbestos, talc, kaolin, mica, barium sulfate, metal oxides and hydroxides, carbon black, graphite, wood flour and flours or fibers of other natural products, synthetic fibers.

13. Other additives, for example plasticisers, lubricants, emulsifiers, pigments, rheology additives, catalysts, flow-control agents, optical brighteners, flameproofing agents, antistatic agents and blowing agents.

14. Benzofuranones and indolinones, for example those disclosed in U.S. Pat. Nos. 4,325,863; 4,338,244; 5,175,312; 5,216,052; 5,252,643; DE-A-4316611; DE-A-4316622; DE-A-4316876; EP-A-0589839 or EP-A-0591102 or 3-[4-(2-acetoxyethoxy)phenyl]-5,7-di-tert-butyl-benzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-dimethyl-4-pivaloyloxyphenyl)-5,7-di-tert-butyl-benzofuran-2-one, 3-(3,4-dimethylphenyl)-5,7-di-tert-butyl-benzofuran-2-one, 3-(2,3-di-methylphenyl)-5,7-di-tert-butyl-benzofuran-2-one.

Conventional additives such as listed components listed above under 1.-11. and 14. are often added in concentrations of from 0.01 to 10%, based on the overall weight of the composition (components a, b and c). Further additives of items 12. and 13., such as fillers or flame retardants, may be contained in much higher amounts, e.g. from 0.1 to about 50% or even 80% by weight of the total composition.

Preferably, the compositions of the present invention do not contain polyphenolic antioxidants. Such polyphenolic antioxidants are for example described in U.S. Pat. No. 5,770,115.

The polymeric material usually contains 0.001 to 10% by weight, most preferably 0.01 to 5% by weight of the stabilizer component (c). The polymeric material can contain mixtures of two or more of the HALS (ii) and/or the hydroxyphenyl UV absorber (i).

The amount of photochromic dye in the polymeric material usually is in the range of about 0.001 to 10% by weight, most preferably 0.01 to 5% by weight, with respect to the total weight of the polymeric material. The polymeric material can contain mixtures of two or more photochromic dyes.

The ratio of component (c) to component (b) can e.g. be in the range of 0.01 to 100 parts, preferably 0.1 to 10 parts, of stabilizer (c) per part of photochromic dye (b).

The ratio of UVA component (i) to HALS component (ii) can e.g. be in the range of 0.01 to 100 parts, most preferably 0.1 to 2 parts, of UV absorber (i) per part of HALS (ii).

The polymeric material, the dye (b) and the stabilizer components (c) often form a homogenous mixture. For specific applications, however, compositions can be made in which components (b) and especially (c) are enriched in a part of the polymeric material, e.g. in the surface areas, or wherein the UV absorber component (i) is enriched in the surface areas while the remaining components are mixed homogenously. Of specific technical importance are 2- or multilayer systems wherein the UV absorber (i) is enriched in an upper layer containing no photochromic dye, while a lower layer contains the dye (b) and HALS (ii), and the UV absorber merely as an optional component. These systems may be obtained by conventional techniques, e.g. coextrusion, adhesion or stacking of layers containing UV absorber (i) or UV absorber (i) and HALS (ii) on one hand, and HALS (ii) and dye (b) on the other hand, and possible further layers, which may improve further properties such as scratch resistance, surface gloss and reflection, adhesion, base colour etc.

The additives/components of the invention and optional further components may be added to the polymer material individually or mixed with one another. If desired, the individual components can be mixed with one another before incorporation into the polymer for example by dry blending, compaction or in the melt.

The incorporation of the components of the invention and optional further components into the polymer is carried out by known methods such as dry blending in the form of a powder, or wet mixing in the form of solutions, dispersions or suspensions for example in an inert solvent, water or oil. The additives of the invention and optional further additives may be incorporated, for example, before or after molding or also by applying the dissolved, melted (soaking process) or dispersed additive or additive mixture to the polymer material, with or without subsequent evaporation of the solvent or the suspension/dispersion agent. They may be added directly into the processing apparatus (e.g. extruders, internal mixers, etc), e.g. as a dry mixture or powder or as solution or dispersion or suspension or melt.

The incorporation can be carried out in any heatable container equipped with a stirrer, e.g. in a closed apparatus such as a kneader, mixer or stirred vessel. The incorporation is preferably carried out in an extruder or in a kneader. It is immaterial whether processing takes place in an inert atmosphere or in the presence of oxygen.

The addition of the additive or additive blend to the polymer can be carried out in all customary mixing machines in which the polymer is melted and mixed with the additives. Suitable machines are known to those skilled in the art. They are predominantly mixers, kneaders and extruders.

The process is preferably carried out in an extruder by introducing the additive during processing.

Particularly preferred processing machines are single-screw extruders, contrarotating and corotating twin-screw extruders, planetary-gear extruders, ring extruders or cokneaders. It is also possible to use processing machines provided with at least one gas removal compartment to which a vacuum can be applied.

Suitable extruders and kneaders are described, for example, in Handbuch der Kunststoffextrusion, Vol. 1 Grundlagen, Editors F. Hensen, W Knappe, H. Potente, 1989, pp. 3-7, ISBN:3-446-14339-4 (Vol. 2 Extrusionsanlagen 1986, ISBN 3-44&614329-7).

For example, the screw length is 1-60 screw diameters, preferably 35-48 screw diameters. The rotational speed of the screw is preferably 10-600 rotations per minute (rpm), very particularly preferably 25-300 rpm.

The maximum throughput is dependent on the screw diameter, the rotational speed and the driving force. The process of the present invention can also be carried out at a level lower than maximum throughput by varying the parameters mentioned or employing weighing machines delivering dosage amounts.

Components to be added can be premixed or added individually.

The additives/components of the invention and optional further additives can also be sprayed onto the polymer material. They are able to dilute other additives (for example the conventional additives indicated above) or their melts so that they can be sprayed also together with these additives onto the material. Addition by spraying during the deactivation of the polymerization catalysts is particularly advantageous; in this case, the steam evolved may be used for deactivation of the catalyst. In the case of spherically polymerized polyolefins it may, for example, be advantageous to apply the additives of the invention, optionally together with other additives, by spraying.

The components of the invention and optional further additives can also be added to the polymer in the form of a concentrate, e.g. a masterbatch, which contains the components in a concentration of, for example, about 1% to about 40% and preferably 2% to about 20% by weight incorporated in a polymer. The polymer must not be necessarily of identical structure than the polymer where the additives are added finally. In such operations, the polymer can be used in the form of powder, granules, solutions, suspensions or in the form of latices.

Incorporation can take place prior to or during the shaping operation, or by applying the dissolved, melted (soaking process) or dispersed compound to the polymer, with or without subsequent evaporation of the solvent. In the case of elastomers, these can also be stabilized as latices. A further possibility for incorporating the additives of the invention into polymers is to add them before, during or directly after the polymerization of the corresponding monomers or prior to crosslinking. In this context the additive of the invention can be added as it is or else in encapsulated form (for example in waxes, oils or polymers).

The materials containing the additives/components of the invention described herein can be used for the production of moldings, rotomolded articles, injection molded articles, blow molded articles, films, tapes, mono-filaments, fibers, nonwovens, profiles, adhesives or putties, surface coatings and the like.

The invention also pertains to a process for stabilizing a photochromic system containing a photochromic dye in a polymer matrix against colour fading induced by irradiation, which process comprises incorporation of a hydroxyphenyl triazine UV absorber and optionally a sterically hindered amine light stabilizer into the polymer matrix and/or into a polymer layer covering said polymer matrix, as well as to the use of a hydroxyphenyl triazine UV absorber and optionally a sterically hindered amine for improving the stability of a photochromic system containing a photochromic dye in a polymer matrix. Preferred processes and uses are in analogy to the compositions described further above or in the examples.

Percentages refer to weight percentages except otherwise stated.

Materials used in the Examples

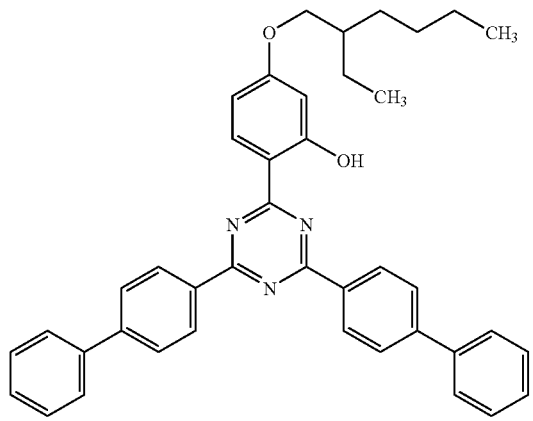

compound UV1 is of the formula
Compound HALS H1 is of the formula

Chromenel is of the formula

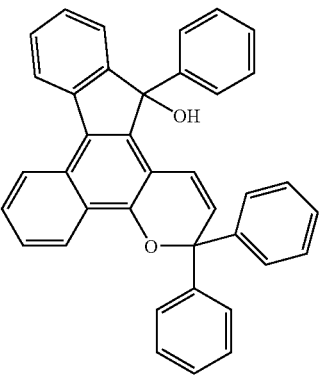

Chromene 2 is of the formula

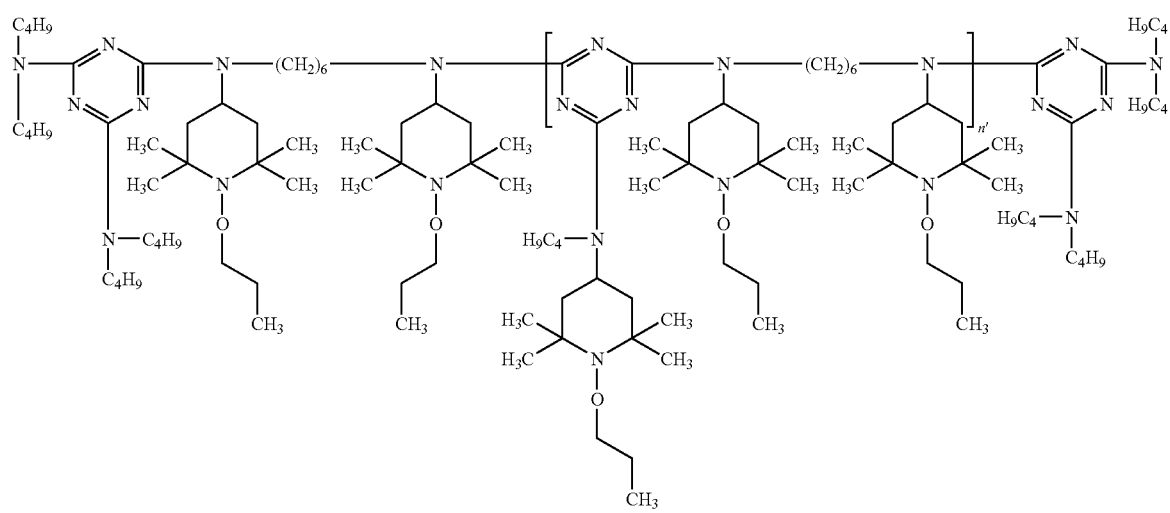

Compound HALS H2 is of the formula

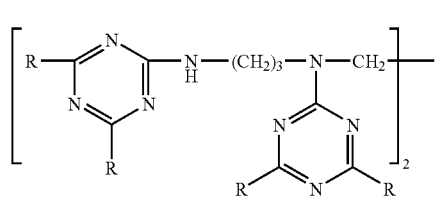

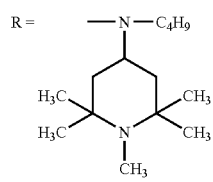

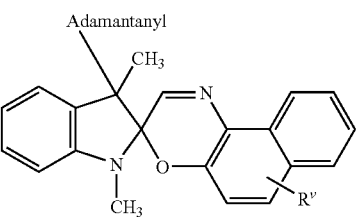

(Rodenstock No. N3)

EXAMPLES

Example 1

Each compound reported in the table below is mixed in a turbo mixer with EVA (ethylenevinylacetate copolymers) Greenflex® ML30 pellets (containing 9% of vinyl acetate, supplied by Polimeri Europa, Italy), characterized by a melt flow index of 2.5 (190° C./16 Kg; ASTM D1238).

| Formulation | EVA g | Chromene1 g | Chromene1 % | HALS H1 g | HALS H1 % |
|---|---|---|---|---|---|
| 1 | 1998 | 2 | 0.1 | — | — |
| 2 | 1992 | 2 | 0.1 | 6 | 0.3 |

The mixtures are blow extruded (using a mono layer Formac Lab. 25 blow extruder) at 160° C. and films of 200 micron thickness are obtained.

The films thus prepared are mounted on a white card and exposed outdoor in the sunshine; a film with formulation 1 covered with a 150 micron thickness film containing 0.15% of the UV absorber UV1 is exposed in the same conditions (formulation: 1 plus UV1).

The covering film is a LDPE film containing as the only added additive 0.15% of UV1. The covering film is prepared by mixing 15 g of UV1 and 9850 g of LDPE Riblene FF 29 supplied by Polimeri Europa; they are mixed in a 'turbomixer' for 10 minutes and blow extruded with a Dolci extruder operating at 210° C.

The table below shows the performance of the three sample films as regards the persistency of the color after light irradiation: the stabilizing effect of UV1 on the chromenel itself and on the chromenel mixed with HALS H1 is evident.

| Formulation | KJ/m2 |
|---|---|
| 1 | 42 |
| 1 plus UV1 | 198 |
| 2 plus UV1 | 1250 |

Example 2

The formulations are prepared as in example 1 but with a different chromene. The formulation compositions and results are shown in the tables below.

| Formulation | EVA g | Chromene2 g | Chromene2 % | HALS H1 g | HALS H1 % |
|---|---|---|---|---|---|
| 3 | 1998 | 2 | 0.1 | — | — |
| 4 | 1992 | 2 | 0.1 | 6 | 0.3 |

| Formulation | KJ/m2 |
|---|---|
| 3 | 388 |
| 3 plus UV1 | 626 |
| 4 plus UV1 | 668 |

Example 3

The formulations are prepared as in example 1 but a different sterically hindered amine is used in this example and UV1 is mixed with the other components, i.e. formulation 7 does not have a covering film.

| Formulation | EVA g | Chromene1 g | Chromene1 % | HALS H2 g | HALS H2 % | UV1 g | UV1 % |
|---|---|---|---|---|---|---|---|
| 6 | 1998 | 2 | 0.1 | — | — | — | — |
| 7 | 1484.25 | 1.5 | 0.1 | 12 | 0.8 | 2.25 | 0.15 |

| Formulation | KJ/m2 |
|---|---|
| 6 | 42 |
| 7 | 709 |

The examples show that the lifetime of the photochromic system is dramatically enhanced by the stabilization system of the invention using a sterically hindered amine in combination with a hydroxyphenyl triazine UV absorber (i).

The invention claimed is:
1. A photochromic composition comprising
   (a) a polymeric material,
   (b) a photochromic dye and
   (c) a stabilizer combination of
      (i) a hydroxyphenyl triazine UV absorber and
      (ii) at least one sterically hindered alkoxyamine light stabilizer, wherein the sterically hindered alkoxyamine is a compound having a molecular weight of 1500-15000 g/mol, and is compound of formula (2g)

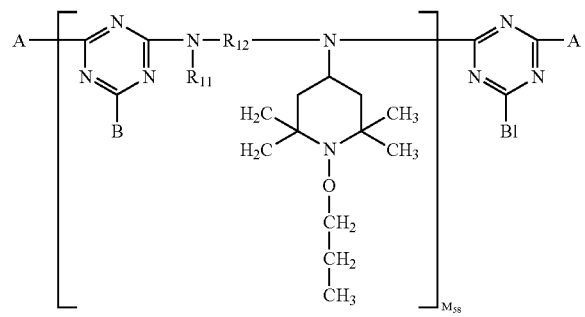

in which the index $m_{18}$ ranges from 1 to 15;
$R_{12}$ is $C_2$-$C_{12}$alkylene, $C_4$-$C_{12}$alkenylene, $C_5$-$C_7$cycloalkylene, $C_5$-$C_7$cycloalkylene-di($C_1$-$C_4$alkylene), $C_1$-$C_4$alkylenedi($C_5$-$C_7$cycloalkylene), phenylenedi($C_1$-$C_4$alkylene) or $C_4$-$C_{12}$alkylene interrupted by 1,4-piperazinediyl, —O— or >N—$X_1$ with $X_1$ being $C_1$-$C_{12}$acyl or ($C_1$-$C_{12}$alkoxy)carbonyl or having one of the definitions of $R_{14}$ given below except hydrogen;
or $R_{12}$ is a group of the formula (2g') or (2g");

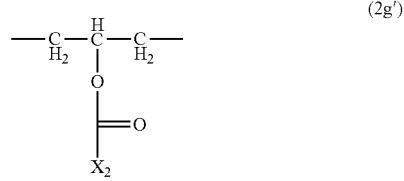

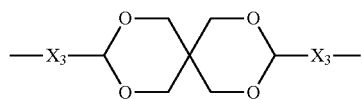

(2g$^x$)

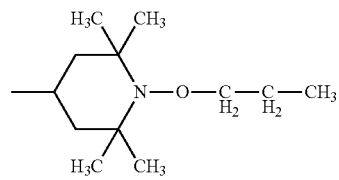

(2g$^V$)

X$_2$ being C$_1$-C$_{18}$alkyl, C$_5$-C$_{12}$cycloalkyl which is unsubstituted or substituted by 1, 2 or 3 C$_1$-C$_4$alkyl; phenyl which is unsubstituted or substituted by 1, 2 or 3 C$_1$-C$_4$alkyl or C$_1$-C$_4$alkoxy; C$_7$-C$_9$phenylalkyl which is unsubstituted or substituted on the phenyl by 1, 2 or 3 C$_1$-C$_4$alkyl; and the radicals X$_3$ being independently of one another C$_2$-C$_{12}$alkylene;

the radicals A are independently of one another —OR$_{13}$, —N(R$_{14}$)(R$_{15}$) or a group of the formula (2g''');

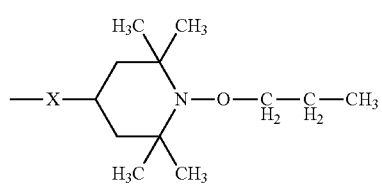

(2g''')

R$_{13}$, R$_{14}$ and R$_{15}$, which are identical or different, are hydrogen, C$_1$-C$_{18}$alkyl, C$_5$-C$_{12}$cycloalkyl which is unsubstituted or substituted by 1, 2 or 3 C$_1$-C$_4$alkyl; C$_3$-C$_{18}$alkenyl, phenyl which is unsubstituted or substituted by 1, 2 or 3 C$_1$-C$_4$alkyl or C$_1$-C$_4$alkoxy; C$_7$-C$_9$-phenylalkyl which is unsubstituted or substituted on the phenyl by 1, 2 or 3 C$_1$-C$_4$alkyl; tetrahydrofurfuryl or C$_2$-C$_4$alkyl which is substituted in the 2, 3 or 4 position by —OH, C$_1$-C$_8$alkoxy, di(C$_1$-C$_4$alkyl)amino or a group of the formula (2g$^{IV}$);

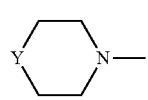

(2g$^{IV}$)

with Y being —O—, —CH$_2$—, —CH$_2$CH$_2$— or >N—CH$_3$, or —N(R$_{14}$)(R$_{15}$) is additionally a group of the formula (2g$^{IV}$);

X is —O— or >N—R$_{16}$;

R$_{16}$ is hydrogen, C$_1$-C$_{18}$alkyl, C$_3$-C$_{18}$alkenyl, C$_5$-C$_{12}$cycloalkyl which is unsubstituted or substituted by 1, 2 or 3 C$_1$-C$_4$alkyl; C$_7$-C$_9$-phenylalkyl which is unsubstituted or substituted on the phenyl by 1, 2 or 3 C$_1$-C$_4$alkyl; tetrahydrofurfuryl, a group of the formula (2g$^V$), or C$_2$-C$_4$alkyl which is substituted in the 2, 3 or 4 position by —OH, C$_1$-C$_8$alkoxy, di(C$_1$-C$_4$alkyl)amino or a group of the formula (2g$^{IV}$);

R$_{11}$ has one of the definitions given for R$_{16}$; and the radicals B have independently of one another one of the definitions given for A, wherein a ratio of component (c) to component (b) is in the range of 0.01 to 100 parts of component (c) per part of component (b), wherein the triazine UV absorber is of formula

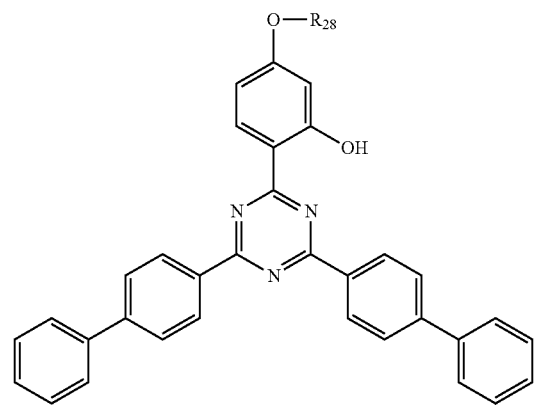

wherein

R$_{28}$ is (CH$_2$—CH$_2$—O—)$_n$—R$_{29}$; —CH$_2$—CH(OH)—CH$_2$—O—R$_{29}$ or —CH(R$_{30}$)—CO—O—R$_{40}$; n is 0 or 1; R$_{29}$ is C$_1$-C$_{13}$alkyl or C$_2$-C$_{20}$alkenyl or C$_6$-C$_{12}$aryl or CO—C$_1$-C$_{18}$alkyl; R$_{30}$ is hydrogen or C$_1$-C$_8$alkyl; R$_{40}$ is C$_1$-C$_{12}$alkyl or C$_2$-C$_{12}$alkenyl or C$_5$-C$_6$cycloalkyl and wherein the photochromic dye is a naphthopyran of formula

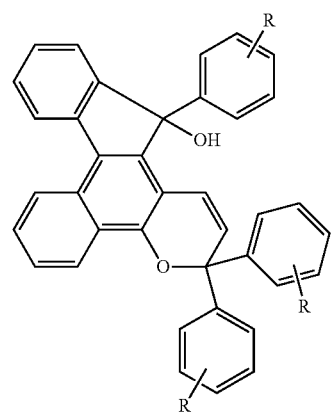

where R is hydrogen; $C_1$-$C_6$alkyl; $C_1$-$C_6$alkoxy; —NR'R"—$NO_2$; where R' and R" independently are hydrogen or $C_1$-$C_{12}$alkyl, $C_4$-$C_{12}$cycloalkyl, $C_7$-$C_{13}$ phenylalkyl or together are tetramethylene or pentamethylene or O-interruped tetramethylene wherein the dye is present in an amount of 0.001 to 10% by weight, with respect to the total weight of the polymeric material (a).

2. The composition according to claim 1, wherein the compostion is an optical device, an architectural or vehicle glazing, a greenhouse film, a coating, a construction element or an ophthalmic lense.

3. The composition according to claim 1, wherein component (a) is selected from the group consisting of polyolefines, polycarbonate, polyesters, styrene polymers or copolymers, polyacrylates, cellulose esters, polyvinylalcohol, polyurethanes, polyvinylbutyrate, polyvinylbutyral, ethylene-vinyl acetate copolymer, ethylene-butyl acrylate copolymer and blends thereof.

4. The composition according to claim 1 wherein the sterically hindered alkoxyamine is 5. The composition of claim 1, wherein the composition is a 2- or multilayer system, wherein the UV absorber (i) is enriched in an upper layer containing no photochromic dye, while a lower layer contains the dye (b) and the sterically hindered alkoxyamine (ii).

6. The composition of claim 1, wherein the polymeric material (a) contains 0.001 to 10% by weight of the stabilizer component (c) comprising a ratio of UV absorber component (i) to sterically hindered alkoxyamine component (ii) in the range 0.01 to 100 parts (i) per 1 part (ii).

7. The composition of claim 1, comprising as component (d) at least one further additive selected from antioxidants, phosphites or phosphonites, processing stabilizers, fillers, pigments, dyes, clarifiers, modifiers, acid scavengers, flame retardants and further light stabilizers.

8. The composition of claim 1, wherein the ratio of component (c) to component (b) is in the range of 0.1 to 10 parts of component (c) per part of component (b).

9. A process of stabilizing a photochromic system comprising (b) a photochromic dye in (a) a polymer matrix against colour fading induced by irradiation, which process comprises incorporating

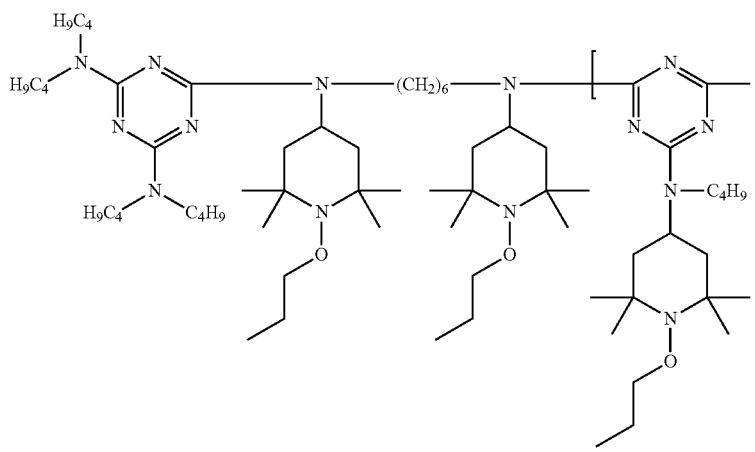

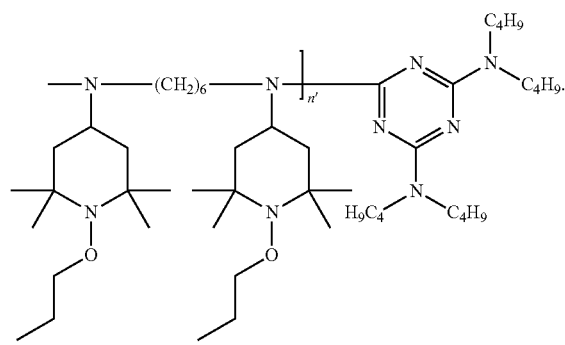

(c) (i) a hydroxyphenyl triazine UV absorber into the polymer matrix and/or into a polymer layer covering said polymer matrix and incorporating (c) (ii) a sterically hindered alkoxyamine light stabilizer into the polymer matrix, wherein the hydroxyphenyl triazine UV absorber (i) is of formula

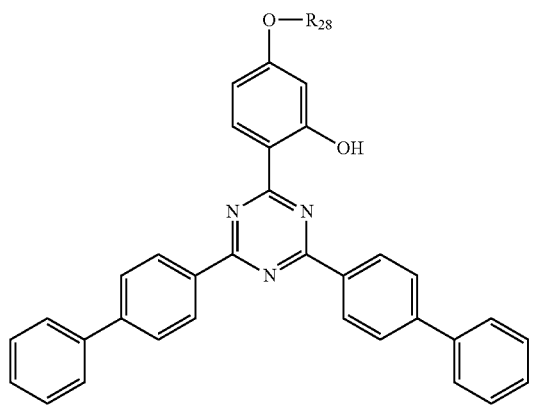

wherein $R_{28}$ is $(CH_2-CH_2-O-)_n-R_{29}$; $-CH_2-CH(OH)-CH_2-O-R_{29}$; or $-CH(R_{30})-CO-O-R_{40}$; n is 0 or 1; $R_{29}$ is $C_1-C_{13}$alkyl or $C_2-C_{20}$alkenyl or $C_6-C_{12}$aryl or $CO-C_1-C_{18}$alkyl; $R_{30}$ is hydrogen or $C_1-C_8$alkyl; $R_{40}$ is $C_1-C_{12}$alkyl or $C_2-C_{12}$alkenyl or $C_5-C_6$cycloalkyl, wherein the sterically hindered alkoxyamine is a compound having a molecular weight of 1500-15000 g/mol, and is compound of formula (2g)

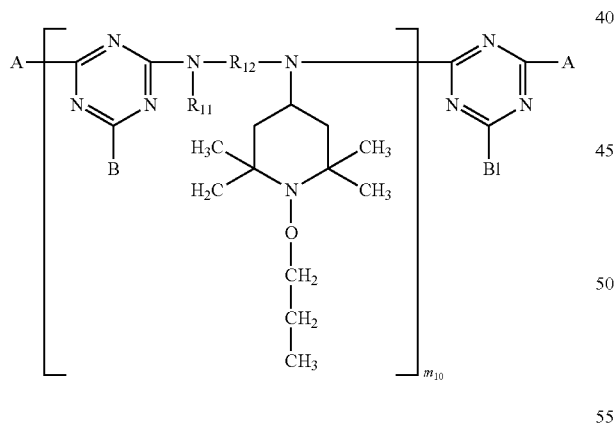

in which the index $m_{18}$ ranges from 1 to 15;

$R_{12}$ is $C_2-C_{12}$alkylene, $C_4-C_{12}$alkenylene, $C_5-C_7$cycloalkylene-di($C_1-C_4$alkylene), $C_1-C_4$alkylenedi($C_5-C_7$cycloalkylene), phenylenedi($C_1-C_4$alkylene) or $C_4-C_{12}$alkylene interrupted by 1,4-piperazinediyl, $-O-$ or $>N-X_1$ with $X_1$ being $C_1-C_{12}$acyl or ($C_1-C_{12}$alkoxy)carbonyl or having one of the definitions of $R_{14}$ given below except hydrogen;

or $R_{12}$ is a group of the formula (2g') or (2g");

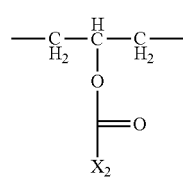

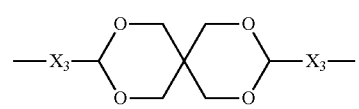

$X_2$ being $C_1-C_{18}$alkyl, $C_5-C_{12}$cycloalkyl which is unsubstituted or substituted by 1, 2 or 3 $C_1-C_4$alkyl; phenyl which is unsubstituted or substituted by 1, 2 or 3 $C_1-C_4$alkyl or $C_1-C_4$alkoxy; $C_7-C_9$phenylalkyl which is unsubstituted or substituted on the phenyl by 1, 2 or 3 $C_1-C_4$alkyl; and the radicals $X_3$ being independently of one another $C_2-C_{12}$alkylene;

the radicals A are independently of one another $-OR_{13}$, $-N(R_{14})(R_{15})$ or a group of the formula (2g''');

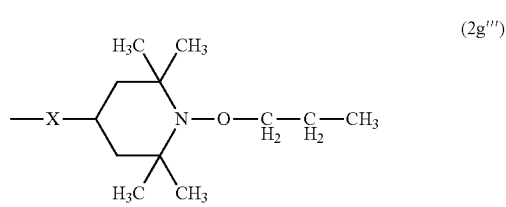

$R_{13}$, $R_{14}$ and $R_{15}$, which are identical or different, are hydrogen, $C_1-C_{18}$alkyl, $C_5-C_{12}$cycloalkyl which is unsubstituted or substituted by 1, 2 or 3 $C_1-C_4$alkyl; $C_3-C_{18}$alkenyl, phenyl which is unsubstituted or substituted by 1, 2 or 3 $C_1-C_4$alkyl or $C_1-C_4$alkoxy; $C_7-C_9$-phenylalkyl which is unsubstituted or substituted on the phenyl by 1, 2 or 3 $C_1-C_4$alkyl; tetrahydrofurfuryl or $C_2-C_4$alkyl which is substituted in the 2, 3 or 4 position by $-OH$, $C_1-C_8$alkoxy, di($C_1-C_4$alkyl)amino or a group of the formula ($2g^{IV}$);

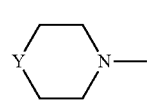

with Y being $-O-$, $-CH_2-$, $-CH_2CH_2-$ or $>N-CH_3$, or $-N(R_{14})(R_{15})$ is additionally a group of the formula ($2g^{IV}$);

X is $-O-$ or $>N-R_{16}$;

$R_{16}$ is hydrogen, $C_1$-$C_{18}$alkyl, $C_3$-$C_{18}$alkenyl, $C_5$-$C_{12}$cycloalkyl which is unsubstituted or substituted by 1, 2 or 3 $C_1$-$C_4$alkyl; $C_7$-$C_9$-phenylalkyl which is unsubstituted or substituted on the phenyl by 1, 2 or 3 $C_1$-$C_4$alkyl; tetrahydrofurfuryl, a group of the formula $(2g^V)$,

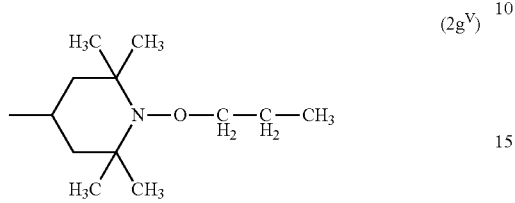

(2g$^V$)

or $C_2$-$C_4$alkyl which is substituted in the 2, 3 or 4 position by —OH, $C_1$-$C_8$alkoxy, di($C_1$-$C_4$alkyl)amino or a group of the formula $(2g^{IV})$;

$R_{11}$ has one of the definitions given for $R_{16}$; and the radicals B have independently of one another one of the definitions given for A, wherein the photochromic dye of component (b) is present in an amount of 0.001 to 10% by weight, with respect to the total weight of the polymeric material (a) and is a naphthopyran of formula

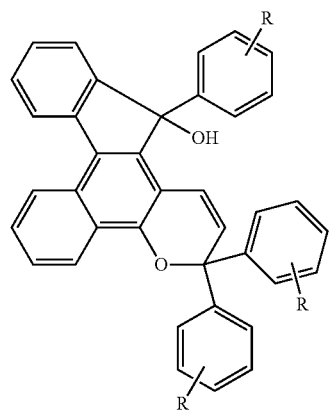

where R is hydrogen; $C_1$-$C_6$alkyl; $C_1$-$C_6$alkoxy; —NR'R''; —NO$_2$; where R' and R'' independently are hydrogen or $C_1$-$C_{12}$alkyl, $C_4$-$C_{12}$cycloakyl, $C_7$-$C_{13}$phenylalkyl or together are tetramethylene or pentamethylene or O-interrupted tetramethylene and wherein a ratio of component (c) to component (b) is in the range of 0.01 to 100 parts of component (c) per part of component (b).

10. The process of claim 9, wherein the ratio of component (c) to component (b) is in the range of 0.1 to 10 parts of component (c) per part of component (b) and, wherein the sterically hindered alkoxyamine is

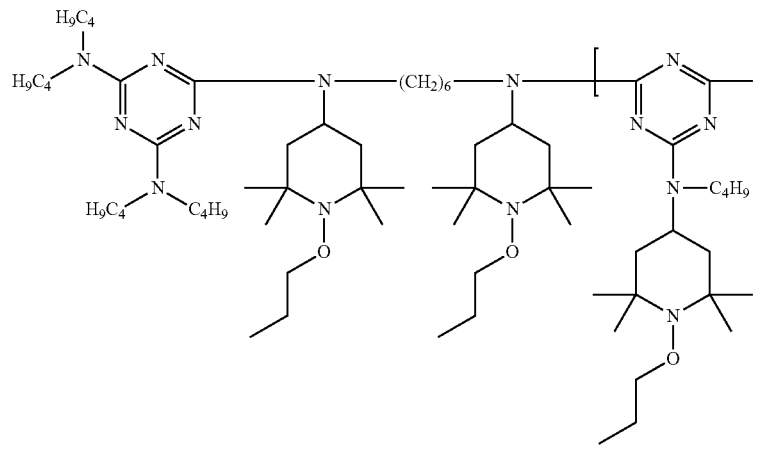

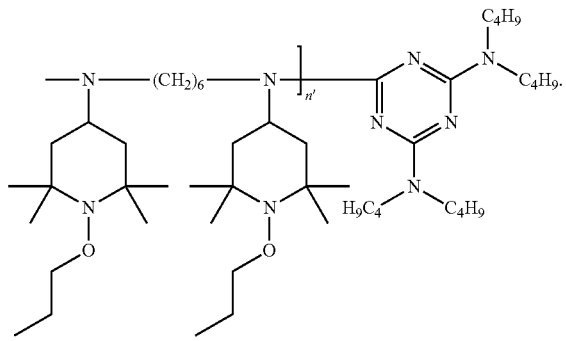

* * * * *